United States Patent [19]

Mizukawa et al.

[11] Patent Number: 5,972,586
[45] Date of Patent: Oct. 26, 1999

[54] SILVER HALIDE COLOR PHOTOSENSITIVE MATERIAL

[75] Inventors: Yuki Mizukawa; Tatsuya Igarashi; Hiroyuki Hirai, all of Minami-Ashigara, Japan

[73] Assignee: Fuji Photo Film Co., Ltd., Minami-Ashigara, Japan

[21] Appl. No.: 09/044,787

[22] Filed: Mar. 20, 1998

Related U.S. Application Data

[62] Division of application No. 08/755,739, Nov. 22, 1996, Pat. No. 5,800,953.

[30] Foreign Application Priority Data

Nov. 22, 1995 [JP] Japan ..................... 7-326258

[51] Int. Cl.$^6$ .................................. G03C 7/327
[52] U.S. Cl. .................. 430/548; 430/503; 430/504
[58] Field of Search ................. 430/548, 503, 430/504

[56] References Cited

U.S. PATENT DOCUMENTS

| | | | |
|---|---|---|---|
| 4,705,745 | 11/1987 | Kitchin et al. | 430/505 |
| 5,017,667 | 5/1991 | Cawse et al. | 526/264 |
| 5,141,844 | 8/1992 | Lau | 430/548 |
| 5,571,663 | 11/1996 | Hirai | 430/504 |

FOREIGN PATENT DOCUMENTS

| | | |
|---|---|---|
| 0321401 | 6/1989 | European Pat. Off. . |
| 55-6342 | 1/1980 | Japan . |
| 62-71950 | 4/1987 | Japan . |
| 62-148952 | 7/1987 | Japan . |

*Primary Examiner*—John A. McPherson
*Attorney, Agent, or Firm*—Burns, Doane, Swecker & Mathis, LLP

[57] ABSTRACT

A silver halide color photosensitive material suitable for production of a color filter which comprises a polymer coupler comprising at least a yellow coupler monomer and a cyan coupler monomer. The photosensitive material provides a green image having excellent spectral transmission characteristics and fastness to heat and light.

4 Claims, 3 Drawing Sheets

FIG. 3 (a) (R-LIGHT EXPOSURE)
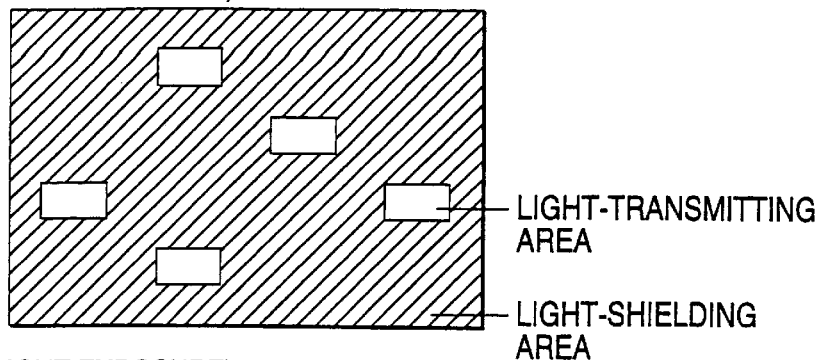
LIGHT-TRANSMITTING AREA
LIGHT-SHIELDING AREA
FIG. 3 (b) (G-LIGHT EXPOSURE)
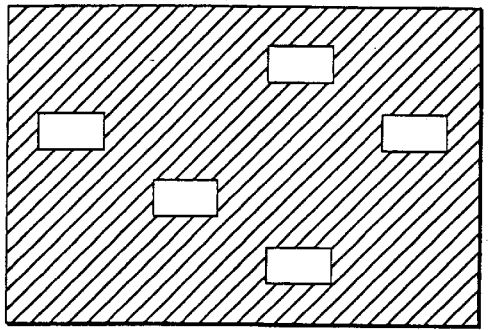
FIG. 3 (c) (B-LIGHT EXPOSURE)
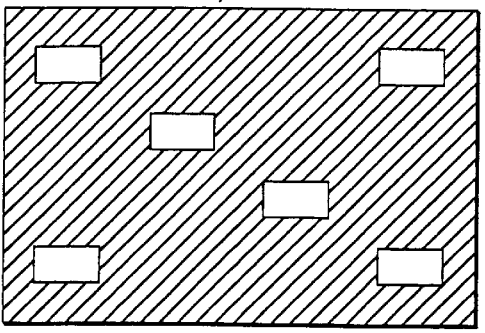
FIG. 3 (d) (WHITE-LIGHT EXPOSURE)
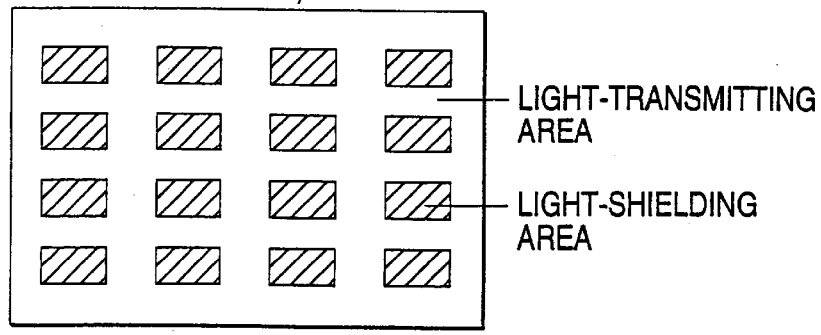
LIGHT-TRANSMITTING AREA
LIGHT-SHIELDING AREA

SILVER HALIDE COLOR PHOTOSENSITIVE MATERIAL

This application is a divisional, of application Ser. No. 08/755,739, filed Nov. 22 1996 now U.S. Pat. No. 5,800,953.

FIELD OF THE INVENTION

The present invention relates to a silver halide color photosensitive material which forms a green color image having excellent spectral transmission characteristics and high fastness to heat and light. The invention also relates to a silver halide photosensitive material which is suitable for producing a color filter having a thin film thickness and excellent flatness, heat fastness and light fastness, a method for producing a color filter using the photosensitive material, and a color filter produced by the method. Furthermore, the invention relates to a silver halide photosensitive material suitable for easily producing a color filter having a black area of high density, a method for producing a color filter using the photosensitive material, and a color filter produced by the method.

BACKGROUND OF THE INVENTION

A color filter is used in a color face plate for Braun tube display, a photoelectric conversion element plate for copying use, a single-tube color television camera filter, a flat panel display using liquid crystals, a color solid image pick-up element, etc.

A common color filter is generally constituted of regularly arranged red, green and blue colors (i.e., three primary colors), but it may have four or more different hues, if needed. For instance, color filters for use in an image pickup tube and a liquid crystal display apparatus require a black pattern (black matrix) for various purposes.

As for the way of arranging red, green and blue colors, mosaic, stripe and delta arrangements are exemplified as examples thereof. How to arrange those colors can be chosen so that the color filter meets requirements for the intended use.

Hitherto known methods for producing color filters include an evaporation method, a dyeing method, a printing method, a pigment dispersion method, an electrodeposition method, a resist electrodeposition transfer method, and so on. However, color filters obtained by these conventional methods have several disadvantages, such as involvement of complicated steps, liability to pinholes or scratches, poor yield, insufficient precision, etc.

In order to overcome these disadvantages, production of color filters using a silver halide photosensitive material of coupler-in-developer type (see JP-A-55-6342, the term "JP-A" as used herein means an "unexamined published Japanese patent application") or coupler-in-emulsion type (see JP-A-62-148952 and JP-A-62-71950) has been studied. However, the coupler-in-developer type development involves at least three times of color development and is not deemed to be simple and easy to carry out. In the coupler-in-emulsion type, on the other hand, the color filter obtained has a large thickness, and tends to suffer peeling during rubbing treatment in the production of an LCD panel or cutting of lines. In particular, it has been difficult to obtain a sharp pattern from the coupler-in-emulsion type color photosensitive material because the material have many photosensitive layer and therefore have a large thickness.

In order to solve those problems, it could be thought that the coating amount of a binder be reduced. However, it turned out that the reduction of a binder coating amount resulted in a relative increase of the proportion of low melting organic compounds in the coated layers to make the generated dyes diffuse easily under a high temperature, thereby causing a problem of providing a blurred pixel pattern.

When used, for example, in color LCD, a color filter is unavoidably exposed to high temperatures above 150° C. in post-treatments, such as coating with a protective layer, vacuum deposition of a transparent electrode, and formation of an orientation film. Accordingly, the dyes used in a color filter are required to be fast and not to be diffused in such high temperatures.

The dyes are also required to have high light fastness because color filters are to be exposed to back light for extended time periods.

SUMMARY OF THE INVENTION

An object of the present invention is to provide a silver halide color photosensitive material which forms a green image having excellent fastness to heat and light.

A second object of the present invention is to provide a color filter which is thin and reduced in pixel blur.

A third object of the present invention is to provide a color filter which has a green color highly fast to heat and light.

A fourth object of the present invention is to provide a color filter which does not require complicated processing steps, has suitability for mass production, hardly causes defects during the process of producing a LCD panel, and has excellent light-transmitting properties.

Other objects and effects of the present invention will be apparent from the following description.

The above objects of the present invention has been achieved by providing:

(1) a silver halide color photosensitive material comprising at least one polymer coupler selected from the group consisting of:

copolymers derived from at least one kind of yellow coupler monomer represented by the following formula (I) and at least one kind of cyan coupler monomer represented by the following formula (II); and copolymers derived from at least one kind of yellow coupler monomer represented by the following formula (I), at least one kind of cyan coupler monomer represented by the following formula (II) and at least one kind of non-color-forming monomer having an ethylene group and no capability to couple with an oxidized product of an aromatic primary amine developing agent:

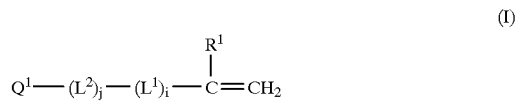

wherein $R^1$ represents a hydrogen atom, a chlorine atom, an alkyl group or an aryl group; $L^1$ represents —C(=O)N($R^2$)—, —C(=O)O—, —N($R^2$)C(=O)—, —OC(=O)—, or a group represented by the following formula (III), (IV) or (V); $R^2$ represents a hydrogen atom, an alkyl group, an aryl group or a heterocyclic group; $L^2$ represents a divalent linkage group connecting $L^1$ with $Q^1$; i represents 0 or 1; j represents 0 or 1; and $Q^1$ represents a yellow coupler residue capable of forming a yellow dye by coupling with an oxidized product of an aromatic primary amine developing agent;

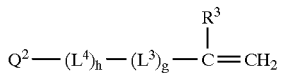
(II)

wherein $R^3$, $L^3$, $L^4$, g and h have the same meanings as $R^1$, $L^1$, $L^2$, i and j in the above formula (I), respectively; and $Q^2$ represents a cyan coupler residue capable of forming a cyan dye by coupling with an oxidized product of an aromatic primary amine developing agent;

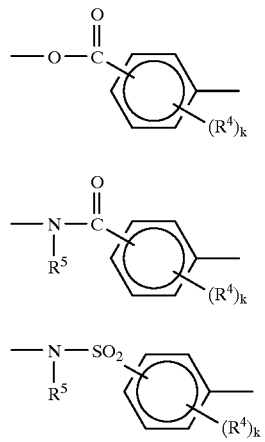

wherein $R^4$ represents a substituent group, $R^5$ has the same meaning as $R^2$ in the above formula (I), and k represents an integer of from 0 to 4;

(2) a silver halide photosensitive material for a color filter, which comprises a support having thereon at least three silver halide emulsion layers each having a different color sinsitivity and containing couplers in such combination as to develop blue, green and red colors, respectively, by coupling with an oxidized product of an aromatic primary amine developing agent wherein the polymer coupler described in the above (1) is used as a color coupler forming a green color;

(3) a silver halide photosensitive material for a color filter according to the above (2), further comprising at least one silver halide emulsion layer which is different in color sensitivity from the other emulsion layers and contains a coupler capable of making color compensation to produce a substantially black color having a transmission density of at least 2.5 when all the couplers on the support undergo coupling reaction;

(4) a method for producing a color filter having pixel patterns of blue, green and red colors, which comprises the steps of:
pattern-exposing the silver halide photosensitive material as described in the above (2) or (3); and
color developing and desilverizing the exposed material;

(5) a color filter produced by the method described in the above (4); and (6) a color filter comprising a dye formed by a coupling reaction of an oxidized product of an aromatic primary amine with the at least one polymer coupler described in the above (1).

BRIEF DESCRIPTION OF THE DRAWINGS

FIGS. 3(a) to 3(d) illustrate an embodiment of the pattern schemes of mask filters for use in exposing the photosensitive material of the present invention.

DETAILED DESCRIPTION OF THE INVENTION

Figure 1:
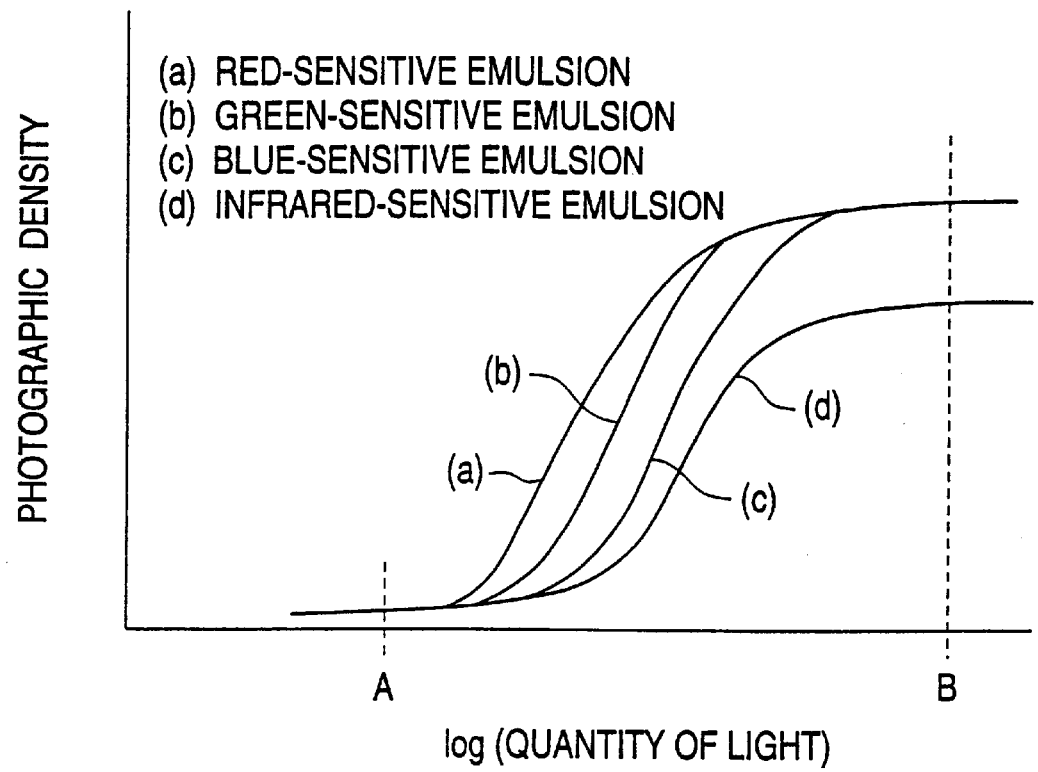
FIG. 1 is a graph showing the characteristic curves of the photosensitive material for use in the present invention.

In formulae (I) and (II) representing a yellow coupler monomer and a cyan coupler monomer, respectively, $R^1$ and $R^3$ each represent a hydrogen atom, a chlorine atom, an alkyl group or an aryl group.

The alkyl group represents a substituted or unsubstituted, straight-chain, branched or cyclic alkyl group containing 1 to 18, preferably 1 to 12, still preferably 1 to 8, carbon atoms. Substituents in the substituted alkyl group include a halogen atom (e.g., fluorine, chlorine or bromine), a hydroxyl group, a cyano group, a carboxyl group, an aryl group containing 6 to 18 carbon atoms (e.g., phenyl or naphthyl), an alkoxy group containing 1 to 24 carbon atoms (e.g., methoxy, ethoxy, propoxy, butoxy, dodecyloxy, hexadecyloxy, methoxyethoxy or isopropoxy), an aryloxy group having 6 to 18 carbon atoms (e.g., phenoxy, 4-chlorophenoxy or 2-methoxyphenoxy), a heterocyclic oxy group having 2 to 12 carbon atoms (e.g., 5-pyrazolyloxy or 2-pyridyloxy), an alkylthio group having 1 to 18 carbon atoms (e.g., methylthio, ethylthio, butylthio, octylthio, dodecylthio or 2-ethylhexylthio), an arylthio group having 6 to 18 carbon atoms (e.g., phenylthio or naphthylthio), an alkoxycarbonyl group having 2 to 24 carbon atoms (e.g., methoxycarbonyl, ethoxycarbonyl, propyloxycarbonyl or octyloxycarbonyl), an aryloxycarbonyl group having 7 to 16 carbon atoms (e.g., phenoxycarbonyl, 4-ethoxyphenoxycarbonyl or 2,4-di-t-amylphenoxycarbonyl), a carbonyloxy group having 2 to 24 carbon atoms (e.g., methylcarbonyloxy, ethylcarbonyloxy, propylcarbonyloxy or heptacarbonyloxy), an acylamino group having 2 to 18 carbon atoms (e.g., acetylamino, butyramide, benzamido or pivalic acid amido), a carbamoyl group having 1 to 18 carbon atoms (e.g., carbamoyl, N-methylcarbamoyl, N-ethylcarbamoyl, N,N-diethylcarbamoyl, N-phenylcarbamoyl or N-cyclohexylcarbamoyl), a sulfonamido group having 1 to 18 carbon atoms (e.g., methanesulfonamido, ethaneuslfonamido, butanesulfonamido or hexadecanesulfonamido), a sulfamoyl group having 1 to 18 carbon atoms (e.g., N-methylsulfamoyl, N-ethylsulfamoyl, N,N-dipropylsulfamoyl, N-phenylsulfamoyl or N-cyclohexylsulfamoyl), an alkoxycarbonylamino group having 2 to 24 carbon atoms (e.g., methoxycarbonylamino or ethoxycarbonylamino), a carbamoylamino group having 2 to 18 carbon atoms (e.g., N-methylcarbamoylamino, N,N-diethylcarbamoylamino or N-phenylcarbamoylamino), an acyl group having 2 to 18 carbon atoms (e.g., acetyl, benzoyl or pivaloyl), an imido group having 3 to 21 carbon atoms (e.g., succinimido, phthalimido or hydantoin-1-yl), and a sulfonyl group having 1 to 24 carbon atoms (e.g., methylsulfonyl, ethylsulfonyl or phenylsulfonyl).

The aryl group is a substituted or unsubstituted aryl group (e.g., phenyl or naphthyl). Substituents in the substituted aryl group include those described above as the substituent in the substituted alkyl group and, in addition, an alkyl group.

$R^1$ and $R^3$ each preferably represent a hydrogen atom or an alkyl group, particularly a hydrogen atom or an unsubstituted alkyl group having 1 to 4 carbon atoms. A hydrogen atom or a methyl group is particularly preferred.

The linkage groups $L^1$ in formula (I) and $L^3$ in formula (II) each represent —C(=O)N($R^2$)—, =C(=O)O—, —N($R^2$)C(=O)—, —OC(=O)— (wherein $R^2$ represents a hydrogen atom, an alkyl group, an aryl group or a heterocyclic group) or a group represented by the above described formula (III), (IV) or (V), wherein $R^4$ represents a substitutent; $R^5$ has the same meaning as $R^2$; and k represents an integer of 0 to 4.

The alkyl group as $R^2$ includes a substituted or unsubstituted, straight-chain, branched or cyclic alkyl group having 1 to 36 carbon atoms, preferably 1 to 18 carbon atoms, still preferably 1 to 8 carbon atoms, and the aryl group as $R^2$ is substituted or unsubstituted. The heterocyclic group as $R^2$ includes a 5- or 6-membered ring containing at least one of a nitrogen atom, an oxygen atom and a sulfur atom, such as a pyrazolyl, imidazolyl, pyridyl, oxazolyl or thiazolyl group. The heterocyclic group may be substituted or unsubstituted. Substituents in the substituted alkyl group and in the substituted heterocyclic group include those described above as the substituent in the substituted alkyl group represented by $R^1$. Substituents in the substituted aryl group include those described above as the substituent in the substituted alkyl group represented by $R^1$ and, in addition, an alkyl group.

$R^2$ is preferably a hydrogen atom, an unsubstituted alkyl group or an unsubstituted aryl group, still preferably a hydrogen atom or an unsubstituted alkyl group, particularly preferably a hydrogen atom.

In formulae (III), (IV) and (V) $R^4$ is a substituent; k is an integer of from 0 to 4; and $R^5$ has the same meaning as $R^2$.

$R^4$ includes a halogen atom (e.g., fluorine, chlorine or bromine), a hydroxyl group, a cyano group, a carboxyl group, a sulfoxy group, a nitro group, an alkyl group having 1 to 36 carbon atoms (e.g., methyl, ethyl, propyl, butyl, hexyl, octyl or hexadecyl), an aryl group having 6 to 18 carbon atoms (e.g., phenyl or naphthyl), an alkoxy group containing 1 to 24 carbon atoms (e.g., methoxy, ethoxy, propoxy, butoxy, dodecyloxy, hexadecyloxy, methoxyethoxy, isopropoxy), an aryloxy group having 6 to 18 carbon atoms (e.g., phenoxy, 4-chlorophenoxy or 2-methoxyphenoxy), a heterocyclic oxy group having 2 to 12 carbon atoms (e.g., 5-pyrazolyloxy or 2-pyridyloxy), an alkylthio group having 1 to 18 carbon atoms (e.g., methylthio, ethylthio, butylthio, octylthio, dodecylthio or 2-ethylhexylthio), an arylthio group having 6 to 18 carbon atoms (e.g., phenylthio or naphthylthio), an alkoxycarbonyl group having 2 to 24 carbon atoms (e.g., methoxycarbonyl, ethoxycarbonyl, propyloxycarbonyl or octyloxycarbonyl), an aryloxycarbonyl group having 7 to 16 carbon atoms (e.g., phenoxycarbonyl, 4-ethoxyphenoxycarbonyl or 2,4-di-t-amylphenoxycarbonyl), a carbonyloxy group having 2 to 24 carbon atoms (e.g., methylcarbonyloxy, ethylcarbonyloxy, propylcarbonyloxy or heptacarbonyloxy), an acylamino group having 2 to 18 carbon atoms (e.g., acetylamino, butaneamido, benzamido or pivalic acid amido), a carbamoyl group having 1 to 18 carbon atoms (e.g., carbamoyl, N-methylcarbamoyl, N-ethylcarbamoyl, N,N-diethylcarbamoyl, N-phenylcarbamoyl or N-cyclohexylcarbamoyl), a sulfonamido group having 1 to 18 carbon atoms (e.g., methanesulfonamido, ethaneuslfonamido, butanesulfonamido or hexadecanesulfonamido), a sulfamoyl group having 1 to 18 carbon atoms (e.g., N-methylsulfamoyl, N-ethylsulfamoyl, N,N-dipropylsulfamoyl, N-phenylsulfamoyl or N-cyclohexylsulfamoyl), an alkoxycarbonylamino group having 2 to 24 carbon atoms (e.g., methoxycarbonylamino or ethoxycarbonylamino), a carbamoylamino group having 2 to 18 carbon atoms (e.g., N-methylcarbamoylamino, N,N-diethylcarbamoylamino or N-phenylcarbamoylamino), an acyl group having 2 to 18 carbon atoms (e.g., acetyl, benzoyl, pivaloyl or cyclohexanoyl), an imido group having 3 to 21 carbon atoms (e.g., succinimido, phthalimido, 3-hexadecenylsuccinimido or hydantoin-1-yl), a sulfonyl group having 1 to 24 carbon atoms (e.g., methylsulfonyl, ethylsulfonyl or phenylsulfonyl), and a 3- to 12-membered, preferably 5- or 6-membered, monocyclic or condensed heterocyclic group having 1 to 24 carbon atoms and containing at least one hetero atom (N, O or S) (e.g., 2-pyridyl, 1-pyrrolyl, morpholino, 1-pyrazolyl or 1-imidazolyl). These groups may be substituted.

$R^4$ preferably represents a halogen atom, a hydroxyl group, a cyano group, a carboxyl group, an alkyl group, an aryl group, an alkoxy group, an aryloxy group, an alkylthio group, an arylthio group, an alkoxycarbonyl group, a carbonyloxy group, an acylamino group, a carbamoyl group, a sulfonamido group, a sulfamoyl group, an alkoxycarbonylamino group, a carbamoylamino group or a sulfonyl group. $R^4$ still preferably represents a halogen atom, a hydroxyl group, an alkoxy group, an alkylthio group, an alkoxycarbonyl group, an acylamino group, a carbamoyl group, a sulfonamido group or a sulfamoyl group. The most preferred is a halogen atom, a hydroxyl group, an alkoxy group, an alkoxycarbonyl group, an acylamino group, a carbamoyl group, a sulfonamido group, or a sulfamoyl group.

k represents an integer of 0 to 4. When k is 2 to 4, the two or more $R^4$ groups may be the same or different. k is preferably 0, 1 or 2, still preferably 0 or 1, particularly preferably 0.

The linkage groups $L^2$ in formula (I) and $L^4$ in formula (II) include those represented by formula (VI):

  (VI)

wherein $J^1$, $J^2$ and $J^3$, which may be the same or different, each represent —$R^7$—, —C(=O)—, —$SO_2$—, —C(=O)N($R^6$)—, —N($R^6$)C(=O)—, —$SO_2$N($R^6$)—, —N($R^6$)$SO_2$—, —N($R^6$)$R^7$N($R^6$)—, —O—, —S—, —N($R^6$)C(=O)N($R^8$)—, —N($R^6$)$SO_2$N($R^8$)—, —C(=O)O—, —OC(=O)—, —N($R^8$)C(=O)O— or —OC(=O)N($R^6$)— (wherein $R^6$ represents a hydrogen atom, an alkyl group or an aryl group; $R^7$ represents an alkylene group, an aralkylene group or an arylene group; and $R^8$ represents a hydrogen atom, an alkyl group or an aryl group); $X^1$, $X^2$ and $X^3$, which may be the same or different, each represent an alkylene group, an arylene group or an aralkylene group; and q, r and s each represent 0 or 1.

$R^6$ and $R^8$ may be the same or different. The alkyl group as $R^6$ or $R^8$ is a substituted or unsubstituted, straight-chain, branched or cyclic alkyl group having 1 to 24 carbon atoms, preferably 1 to 18 carbon atoms. Examples of the alkyl group include methyl, ethyl, propyl, butyl, octyl, dodecyl, octadecyl, isopropyl, t-butyl, cyclohexyl, adamantyl, 2-dodecyloxyethyl, 3-tetradecyloxypropyl and 3-(2,4-di-t-amylphenoxy)propyl groups. Substituents in the substituted alkyl group include those described as the substituent in the substituted alkyl group represented by $R^1$.

The aryl group as $R^6$ or $R^8$ may be substituted or unsubstituted and has 1 to 24 carbon atoms, preferably 1 to 18 carbon atoms. Substituents in the substituted aryl group include those illustrated as examples of the substituent $R^4$. Examples of the aryl group include phenyl, naphthyl, 2-methoxyphenyl, 2,5-dichlorophenyl, 3-ethoxycarbonylphenyl, 3-carboxyphenyl, 4-t-butylphenyl, 4-methylphenyl, 2-fluorophenyl, 3-acetylaminophenyl, 3-(N-hexylcarbamoyl)phenyl and 2-butoxy-5-t-octylphenyl.

$R^6$ and $R^8$ each preferably represent a hydrogen atom or an alkyl group, still preferably a hydrogen atom or an unsubstituted alkyl group, particularly preferably a hydrogen atom or a straight-chain or branched unsubstituted alkyl group containing 1 to 18 carbon atoms.

Examples of the alkylene group as $R^7$ includes substituted or unsubstituted, straight-chain, branched or cyclic alkylene groups having 1 to 24 carbon atoms, preferably 1 to 12 carbon atoms, such as methylene, ethylene, propylene, propylmethylene, hexylmethylene and cyclohexylene. Examples of the aralkylene group as $R^7$ includes substituted or unsubstituted aralkylene groups having 1 to 24 carbon atoms, preferably 1 to 12 carbon atoms, such as phenylmethylene and phenylethylene. Examples of the arylene group as $R^7$ includes substituted or unsubstituted arylene groups having 1 to 24 carbon atoms, preferably 1 to 12 carbon atoms, such as phenylene and naphthylene. Substituents in the substituted alkylene, aralkylene and arylene group include those described above as examples of $R^4$.

The alkylene group includes a substituted or unsubstituted and straight-chain, branched or cyclic alkylene group. The arylene group and aralkylene group as $X^1$, $X^2$ and $X^3$ are substituted or unsubstituted. The alkylene group, arylene group and aralkylene group as $X^1$, $X^2$ and $X^3$ has the same carbon number and examples as those of $R^7$, respectively. Substituents in the substituted alkylene, arylene or aralkylene group include those described above as examples of $R^4$.

The yellow coupler residue represented by $Q^1$ in formula (I) includes a residue of couplers of pivaroylacetanilide type, benzoylacetanilide type, malonic diester type, malonic diamide type, dibenzoylmethane type, benzothiazolylacetamide type, malonic ester monoamide type (examples are given in JP-A-5-313323), benzoxazolylacetamide type, benzimidazolylacetamide type or cycloalkanoylacetamide type (examples are given in JP-A-4-218042). Residues of the couplers described in U.S. Pat. Nos. 5,021,332, 5,021,330, and 5,213,958 and EP-A-421221 and European Patent 0482552 are also useful.

The yellow coupler residue represented by $Q^1$ preferably includes those represented by formulae (Cp-1) and (Cp-2) shown below. These residues are bonded to linkage group $L^2$ or $L^1$ via any of their substituents $R^{51}$ $R^{52}$ and $R^{53}$.

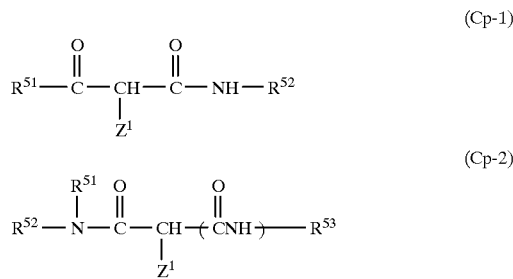

wherein $R^{51}$, $R^{52}$ and $R^{53}$ each represent an alkyl group, an alkenyl group, an aryl group or a heterocyclic group; b represents 0 or 1; and $Z^1$ represents a hydrogen atom or a group which dissociates itself upon reaction with an oxidized product of an aromatic primary amine developing agent.

The alkyl group as $R^{51}$, $R^{52}$ or $R^{53}$ is a substituted or unsubstituted and straight-chain, branched or cyclic alkyl group having 1 to 36 carbon atoms, preferably 1 to 18 carbon atoms. Examples thereof include methyl, ethyl, propyl, butyl, hexyl, octyl, dodecyl, isopropyl, isobutyl, 2-ethylhexyl, t-butyl, adamantyl, cyclopropyl, methylcyclopropyl, ethylcyclopropyl, benzylcyclopropyl, cyclopentyl and cyclohexyl groups. Substituents in the substituted alkyl group include those described above as the substituent in the substituted alkyl group represented by $R^1$.

Examples of the alkenyl group as $R^{51}$, $R^{52}$ or $R^{53}$ include those having 2 to 36 carbon atoms, preferably 2 to 18 carbon atoms, such as vinyl, hexadecenyl, octadecenyl.

The aryl group as $R^{51}$, $R^{52}$ or $R^{53}$ is substituted or unsubstituted having 6 to 36 carbon atoms, preferably 6 to 18 carbon atoms. Examples thereof include phenyl, naphthyl, 4-methoxyphenyl, 3-methylphenyl, 2,5-dichlorophenyl, 2-chloro-5-ethoxycarbonylphenyl, 2-chloro-5-acetylaminophenyl, 2-methoxy-5-methanesulfoneamidophenyl, 2-phenoxy-5-(N-butylsulfamoyl)phenyl, 2-(2-ethylhexyloxy)-5-(N-butylcarbamoyl)phenyl. Substituents in the substituted aryl group include the groups enumerated as examples of $R^4$.

The heterocyclic group as $R^{51}$, $R^{52}$ or $R^{53}$ is a 3- to 12-membered, preferably 5- to 7-membered monocyclic or condensed ring containing at least one of a nitrogen atom, an oxygen atom and a sulfur atom. Examples thereof include pyrazolyl, imidazolyl, triazolyl, thiazolyl, oxazolyl, benzimidazolyl, benzpyrazolyl, pyrazoline-5-on, indoline, pyridyl.

The group capable of dissociating itself by the reaction with an oxidized product of an aromatic primary amine developing agent represented by $Z^1$ halogen atoms (fluorine, chlorine, bromine, iodine), heterocyclic groups and imido groups each capable of dissociating itself at the site of nitrogen atom (e.g., the dissociative groups described in JP-A-56-38044, JP-B-58-10739 (the term "JP-B" as used herein means an "examined Japanese patent publication"), JP-B-56-54134, JP-B-56-54135), alkylthio groups (e.g., the dissociative groups described in JP-A-56-126833), arylthio groups (e.g., the dissociative groups described in U.S. Pat. No. 4,351,897 and JP-A-02-160233), alkoxy groups (e.g., the dissociative groups described in European Patent 0423727), aryloxy groups (e.g., the dissociative groups described in European Patents 428,902 and 299,726), the dissociative groups described in U.S. Pat. No. 4,072,525, JP-A-05-34878, JP-A-05-313322, European Patent 514,896, JP-A-06-347960 and JP-A-07-48376, and a carbonyloxy group and a carbamoyloxy group.

Still preferred yellow coupler residues as $Q^1$ are those represented by formulae (Cp-3), (Cp-4) and (Cp-5) shown below. These residues are bonded to the linkage group $L^2$ or $L^1$ via any of their substituents $R^{54}$, $R^{55}$, $R^{56}$ and $R^{57}$.

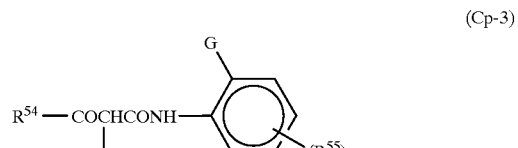

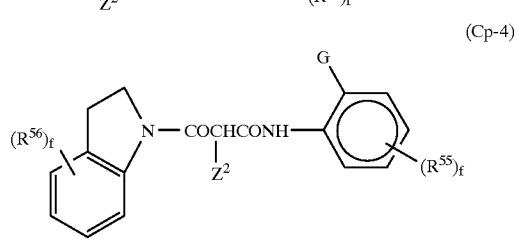

(Cp-5)

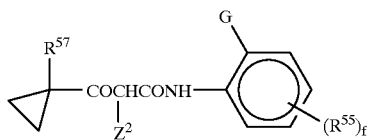

wherein $R^{54}$ represents a tertiary alkyl group; G represents a substituent; $R^{55}$ and $R^{56}$ each represent a substituent; f represents an integer of from 0 to 4; $Z^2$ represents a hydrogen atom or a group capable of dissociating itself by the reaction with an oxidized product of an aromatic primary amine developing agent; and $R^{57}$ represents an alkyl group or an aralkyl group.

The tertiary alkyl group as $R^{54}$ includes a substituted or unsubstituted, chain-form or cyclic tertiary alkyl group. Substituents in the substituted tertiary alkyl group include those described as the substituent in the substituted alkyl group represented by $R^1$. $R^{54}$ is preferably an unsubstituted chain-form or cyclic tertiary alkyl group, such as a t-butyl or adamantyl group. A t-butyl group is particularly preferred.

The substitutent as G has the same meaning as the substituents described for $R^4$ and preferably includes a halogen atom, an alkoxy group, an aryloxy group, an alkylthio group, an arylthio group, a heterocyclic thio group, an ester group, an amido group, a sulfonamido group and a heterocyclic group, with a halogen atom, an alkoxy group, an aryloxy group, an alkylthio group and an arylthio group being still preferred. Particularly preferred are a halogen atom (e.g., fluorine or chlorine), an alkoxy group having 1 to 36 carbon atoms, especially 1 to 18 carbon atoms (e.g., methoxy, ethoxy, propoxy, isopropoxy, butoxy, 2-ethylhexyloxy, dodecyloxy or hexadecyloxy), and an aryloxy group having 6 to 24 carbon atoms, especially 6 to 12 carbon atoms (e.g., phenoxy, 2-methoxyphenoxy, 4-methoxyphenoxy, 4-methylphenoxy, or 4-t-butylphenoxy).

The substituent as $R^{55}$ or $R^{56}$ includes those described for $R^4$, preferably a halogen atom, a carbonamido group, a sulfonamido group, an ester group, a carbamoyl group, a sulfamoyl group, an alkoxy group, an aryloxy group, an alkylthio group, an arylthio group, an alkyl group and an aryl group. A halogen atom, a carbonamido group, a sulfonamido group, an ester group, a carbamoyl group and a sulfamoyl group are still preferred. A halogen atom, a carbonamido group, an ester group and a carbamoyl group are particularly preferred.

When f is 2 to 4, the two or more $R^{55}$ groups or $R^{56}$ groups may be the same or different. f in $(R^{55})_f$— is preferably 1 or 2, and that in $(R^{56})_f$— is preferably 0.

$Z^2$ has the same meaning as $Z^1$ (a hydrogen atom or a group capable of dissociating itself by the reaction with an oxidized product of an aromatic primary amine developing agent). Suitable examples of the dissociative group represented by $Z^2$ include heterocyclic groups and imido groups of the type which have a nitrogen atom at the dissociation site, an alkylthio group, an arylthio group, an alkoxy group and an aryloxy group. Of these groups, the above described type of heterocyclic group and imido group, an alkylthio group, an arylthio group and an aryloxy group are preferred. Most preferably, $Z^2$ is a heterocyclic or imido group of the type which has a nitrogen atom at the dissociation site.

The alkyl group as $R^{57}$ is a substituted or unsubstituted, or straight-chain or branched alkyl group. Substituents in the substituted alkyl group include those mentioned as examples of the substituents in the substituted alkyl group represented by $R^1$. The aralkyl group as $R^{57}$ is a substituted or unsubstituted aralkyl group. Substituents in the substituted aralkyl group include those mentioned for $R^4$. $R^{57}$ preferably represents a methyl, ethyl, propyl, butyl, isopropyl, isobutyl, benzyl, hexyl, octyl, dodecyl or hexadecyl group, still preferably a methyl, ethyl, propyl, butyl, isopropyl, isobutyl or benzyl group, with a methyl, ethyl, propyl or benzyl group being particularly preferred.

$Q^2$ in formula (II) represents a cyan coupler residue. Examples of the cyan coupler residue include, for example, those of phenol type, naphthol type or 5-amidonaphthaol type (examples are given in JP-A-61-153640). The coupler residues described in U.S. Pat. Nos. 4,746,602, 5,256,526, and 5,270,153, European Patent 249453, and JP-A-6-84315 are also useful.

The cyan coupler residue represented by $Q^2$ preferably includes those represented by formulae (Cp-6) through (Cp-10):

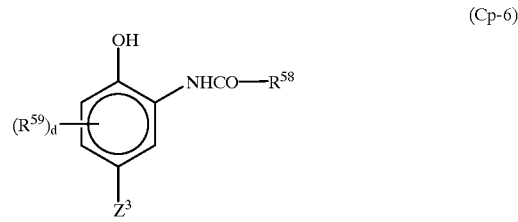

(Cp-6)

(Cp-7)

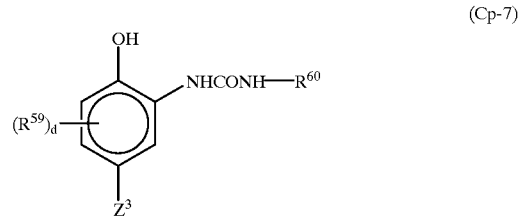

(Cp-8)

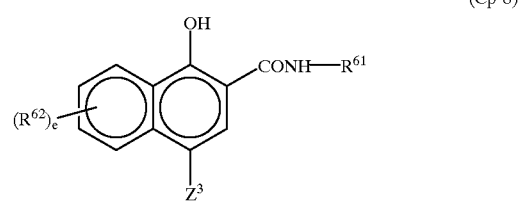

(Cp-9)

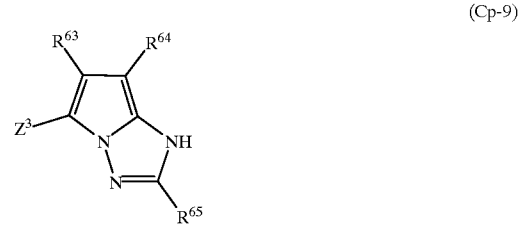

(Cp-10)

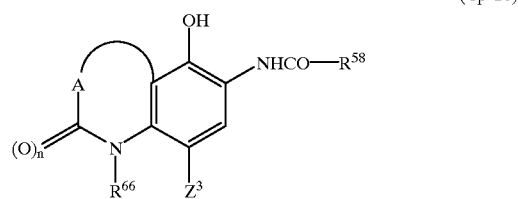

wherein $R^{58}$ represents $R^{41}$, $R^{41}O$— or $R^{41}N(R^{43})$— (wherein $R^{41}$ represents an alkyl group, an alkenyl group, an aryl group or a heterocyclic group, and $R^{43}$ represents a hydrogen atom, an alkyl group, an alkenyl group, an aryl group or a heterocyclic group);

$R^{59}$ represents $R^{41}$, $R^{41}C(=O)N(R^{43})$—, $R^{41}OC(=O)N(R^{43})$—, $R^{41}SO_2N(R^{43})$—, $R^{43}(R^{44})NC(=O)N$ ($R^{45}$)—, $R^{41}O$—, $R^{41}S$—, a halogen atom or $R^{41}N$($R^{43}$)— (wherein $R^{44}$ and $R^{45}$ each have the same meaning as $R^{43}$);

d represents an integer of 0 to 3 (when d is 2 or 3, the two or three $R^{59}$ groups may be the same or different);

$R^{60}$ and $R^{61}$ each have the same meaning as $R^{41}$; $R^{62}$ represents —$NH_2$, $R^{41}$, $R^{43}C(=O)N(R^{44})$—, $R^{41}OC(=O)N(R^{43})$—, $R^{41}N(R^{43})C(=O)N(R^{44})$—, $R^{41}SO_2N(R^{43})$—, $R^{41}N(R^{43})SO_2N)R^{44}$—, $R^{41}O$—, $R^{41}N(R^{43})$—, $R^{41}OC(=O)$—, $R^{41}N(R^{43})C(=O)$—, $R^4$—$SO_2$—, $R^{41}N(R^{43})SO_2$— or a halogen atom;

e represents an integer of 0 to 4 (when e is 2 to 4, the 2 to 4 $R^{62}$ groups may be the same or different);

$R^{63}$ and $R^{64}$ each represent —$NH_2$, $R^{41}$, $R^{43}C(=O)N(R^{44})$—, $R^{43}N(R^{44})C(=O)$—, $R^{41}SO_2N(R^{43})$—, $R^{41}N(R^{43})SO_2$—, $R^{41}SO_2$—, $R^{43}OC(=O)$—, $R^{43}OSO_2$—, a halogen atom, a nitro group, a cyano group, a carboxyl group, a hydroxyl group or $R^{43}CO$—;

$R^{65}$ represents $R^{43}$, $R^{41}S$—, $R^{43}O$—, $R^{41}C(=O)N(R^{43})$—, $R^{41}SO_2N(R^{43})$—, $R^{41}N(R^{43})$— or $R^{45}N(R^{43})C(=O)N(R^{44})$—;

$R^{66}$ represents $R^{43}$;

n represents 0 or 1;

A represents an atomic group necessary to form a 5-, 6- or 7-membered ring together with the adjacent carbon atoms; and $Z^3$ has the same meaning as $Z^1$.

The cyan coupler residues of formulae (Cp-6) through (Cp-10) are bonded to the linkage group $L^3$ or $L^4$ via any of the substituents $R^{58}$ to $R^{66}$. The above-described groups as $R^{58}$, $R^{59}$, $R^{60}$, $R^{61}$, $R^{62}$, $R^{63}$, $R^{64}$, $R^{65}$, and $R^{66}$ may have a substituent selected from those illustrated as the substituent in the substituted alkyl group represented by $R^1$.

Of the cyan coupler residues represented by formulae (Cp-6) through (Cp-10) still preferred are those represented by formulae (Cp-11) to (Cp-14):

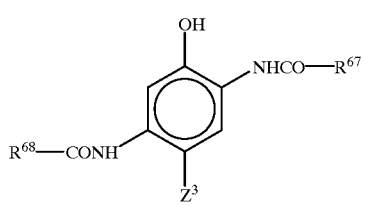
(Cp-11)

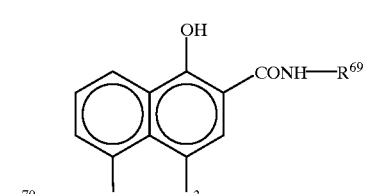
(Cp-12)

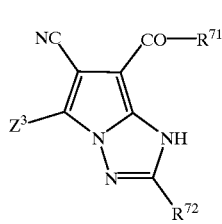
(Cp-13)

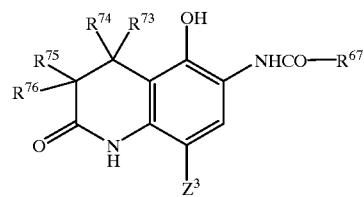
(Cp-14)

wherein $R^{67}$, $R^{68}$, $R^{70}$, and $R^{71}$ each independently have the same meaning as $R^{58}$; $R^{69}$ has the same meaning as $R^{61}$; $R^{72}$ has the same meaning as $R^{65}$; $R^{73}$, $R^{74}$, $R^{75}$ and $R^{76}$ each independently represent a hydrogen atom, a halogen atom, an alkyl group or an aryl group; $R^{73}$ and $R^{74}$, $R^{74}$ and $R^{75}$ or $R^{75}$ and $R^{76}$ may be connected to each other to form a 5- to 7-membered ring; and $Z^3$ has the same meaning as $Z^1$.

$R^{67}$ and $R^{68}$ each preferably represent an alkyl group, an alkenyl group, an aryl group or an alkoxy group, still preferably an alkyl group, an alkenyl group or an aryl group, particularly preferably an alkyl group.

$R^{69}$ preferably represents an alkyl group, an aryl group or a heterocyclic group, still preferably an alkyl group or an aryl group, particularly preferably an alkyl group.

$R^{70}$ preferably represents an alkyl group, an alkenyl group, an aryl group, a heterocyclic group or an alkoxy group, still preferably an alkyl group, an aryl group, a heterocyclic group or an alkoxy group, particularly preferably an alkyl group or an alkoxy group.

$R^{71}$ preferably represents an alkyl group, an aryl group, an alkoxy group, an aryloxy group, an alkylamino group, an arylamino group or a heterocyclic amino group, still preferably an alkoxy group, an aryloxy group, an alkylamino group, an arylamino group or a heterocyclic amino group, particularly preferably an alkoxy group, an aryloxy group, an alkylamino group or an arylamino group.

$R^{72}$ preferably represents an alkyl group, an aryl group, a heterocyclic group, an alkoxy group, an aryloxy group, an alkylamino group or an amido group, still preferably an alkyl group, an aryl group, a heterocyclic group, an alkoxy group or an aryloxy group, particularly preferably an alkyl group, an aryl group or a heterocyclic group.

$R^{73}$, $R^{74}$, $R^{75}$, and $R^{76}$ each preferably represents a hydrogen atom, an alkyl group or an aryl group, or $R^{73}$ and $R^{74}$, $R^{74}$ and $R^{75}$, or $R^{75}$ and $R^{76}$ are preferably connected to each other to form a 5- or 6-membered ring. Still preferably, $R^{73}$, $R^{74}$, $R^{75}$, and $R^{76}$ each represents a hydrogen atom or an alkyl group, or $R^{73}$ and $R^{74}$, $R^{74}$ and $R^{75}$, or $R^{75}$ and $R^{76}$ are connected to each other to form a 5- or 6-membered hydrocarbon ring. Particularly preferably, $R^{73}$, $R^{74}$, $R^{75}$, and $R^{76}$ each represents a hydrogen atom or an alkyl group.

$Z^3$ preferably represents a hydrogen atom, a halogen atom, an alkylthio group, an arylthio group, an alkoxy group, an aryloxy group, a carbonyloxy group or a carbamoyloxy group, still preferably a hydrogen atom, a halogen atom, an alkoxy group, an aryloxy group, a carbonyloxy group or a carbamoyloxy group, particularly preferably a hydrogen atom or a halogen atom.

Of the cyan coupler residues represented by formulae (Cp-11) to (Cp-14), those represented by formula (Cp-12) are particularly preferred, in which $R^{69}$ is preferably an alkyl group or an aryl group; $R^{70}$ is preferably an alkyl group, an aryl group, an alkoxy group, an alkylamino group, an arylamino group or a heterocyclic group; and $Z^3$ is preferably a hydrogen atom, a halogen atom, an alkoxy group or an aryloxy group. Still preferably, $R^{69}$ is an alkyl group or an aryl group; $R^{70}$ is an alkyl group, an aryl group, an alkoxy group or a heterocyclic group; and $Z^3$ is a hydrogen atom or a halogen atom. Particularly preferably, $R^{69}$ is an alkyl group or an aryl group; $R^{70}$ is an alkyl group or an alkoxy group; and $Z^3$ is a hydrogen atom or a halogen atom.

The yellow coupler monomer represented by formula (I) preferably includes those in which $Q^1$ is represented by formula (Cp-1) or (Cp-2); $R^1$ is a hydrogen atom or an alkyl group; $L^1$ represents —C(=O)N($R^2$)—, C(=O)O—, —N($R^2$)C(=O)—, —OC(=O)—, or the group of formula (III), (IV) or (V); i is 0 or 1; $R^2$ is a hydrogen atom, an unsubstituted alkyl group or an unsubstituted aryl group; $L^2$ represents a divalent linkage group; and j is 0 or 1. Still preferred are those in which $Q^1$ is represented by formula (Cp-3), (Cp-4) or (Cp-5); $R^1$ is a hydrogen atom or an alkyl group; $L^1$ is —N($R^2$)C(=O)—, —OC(=O)—, or the group of formula (III), (IV) or (V); i is 1; $R^2$ is a hydrogen atom, an unsubstituted alkyl group or an unsubstituted aryl group; $L^2$ is a divalent linkage group; and j is 0 or 1. Particularly preferred are those in which $Q^1$ is represented by formula (Cp-3), (Cp-4) or (Cp-5); $R^1$ is a hydrogen atom or an unsubstituted alkyl group having 1 to 4 carbon atoms; $L^1$ is —N($R^2$)C(=O)—, —OC(=O)—, or the group of formula (III), (IV) or (V); i is 1; $R^2$ is a hydrogen atom, an unsubstituted alkyl group or an unsubstituted aryl group; $L^2$ is a divalent linkage group; and j is 0 or 1.

Preferred ranges of the substituents in formulae (Cp-3), (Cp-4), (Cp-5), (III), (IV), and (V) are as described above.

The cyan coupler monomer represented by formula (II) preferably includes those in which $Q^2$ is represented by any of formulae (Cp-6) to (Cp-10); $R^3$ is a hydrogen atom or an alkyl group; $L^3$ is —C(=O)N($R^2$)—, C(=O)O—, —N($R^2$)C(=O)—, —OC(=O)—, or the group of formula (III), (IV) or (V); g is 0 or 1; $R^2$ is a hydrogen atom, an unsubstituted alkyl group or an unsubstituted aryl group; $L^4$ is a divalent linkage group; and h is 0 or 1. Still preferred are those in which $Q^2$ is represented by any of formulae (Cp-11) to (Cp-14); $R^3$ is a hydrogen atom or an alkyl group; $L^3$ is —N($R^2$)C(=O)—, —OC(=O)—, or the group of formula (III), (IV) or (V); g is 1; $R^2$ is a hydrogen atom, an unsubstituted alkyl group or an unsubstituted aryl group; $L^4$ is a divalent linkage group; and h is 0 or 1. Particularly preferred are those in which $Q^2$ is represented by formula (Cp-12); $R^3$ is a hydrogen atom or an unsubstituted alkyl group having 1 to 4 carbon atoms; $L^3$ is —N($R^2$)C(=O)—, —OC(=O)—, or the group of formula (III), (IV) or (V); g is 1; $R^2$ is a hydrogen atom, an unsubstituted alkyl group or an unsubstituted aryl group; $L^4$ is a divalent linkage group; and h is 0 or 1.

Preferred ranges of the substituents in formulae (Cp-6) to (Cp-14), (III), (IV), and (V) are as described above.

Specific examples of the yellow coupler monomers for use in the present invention are shown below, but the invention should not be construed as being limited thereto.

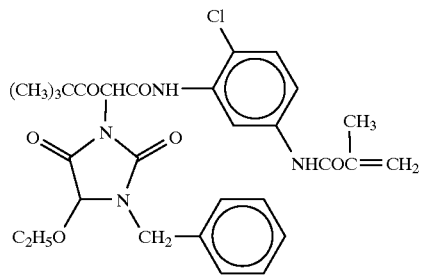

Y-1

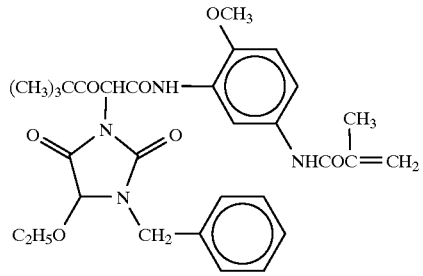

Y-2

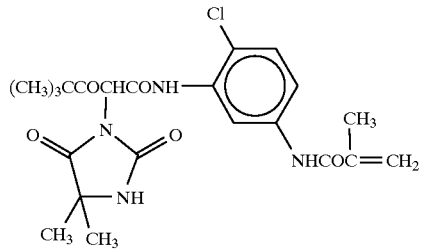

Y-3

-continued
Y-4
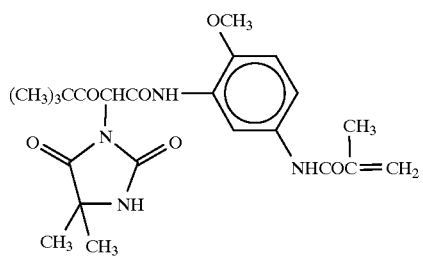
Y-5
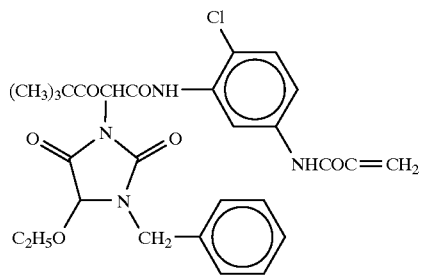
Y-6
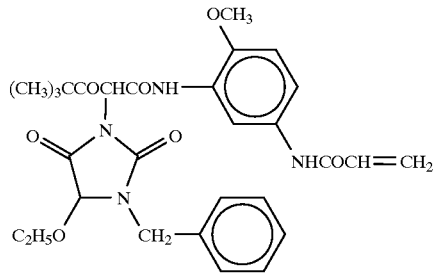
Y-7
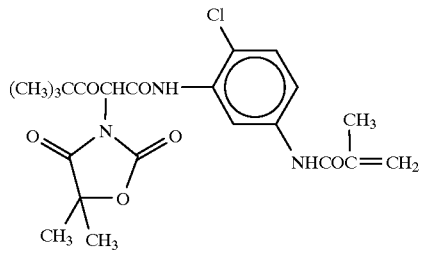
Y-8
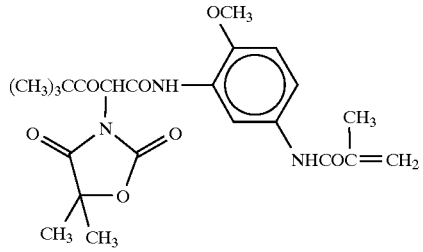
Y-9
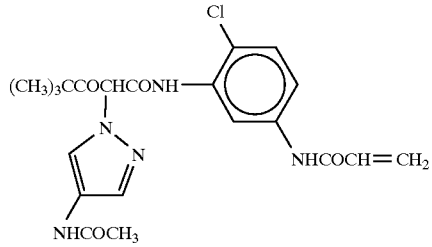

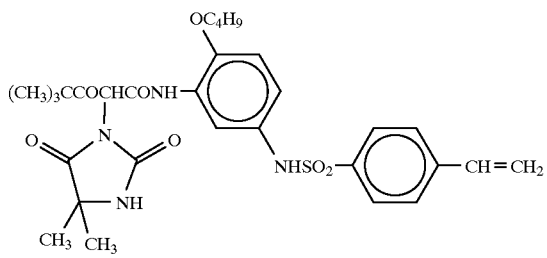
Y-10
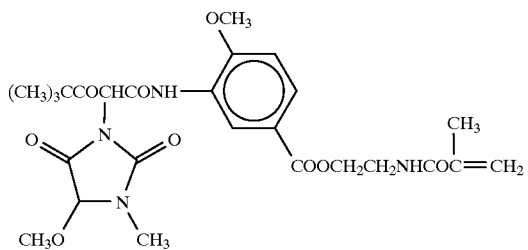
Y-11
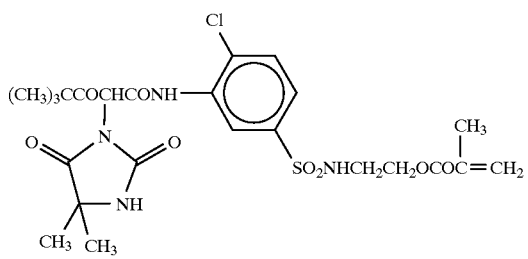
Y-12
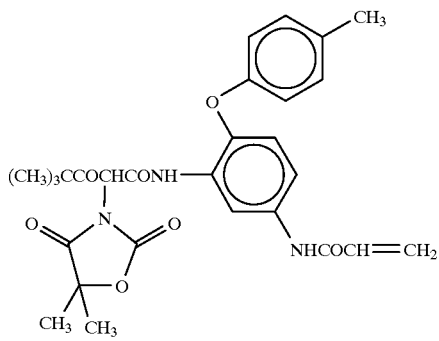
Y-13
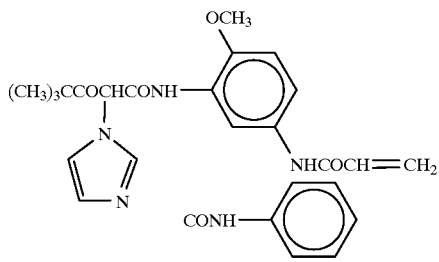
Y-14

Y-15
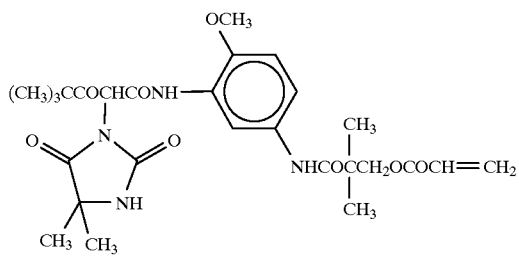
Y-16
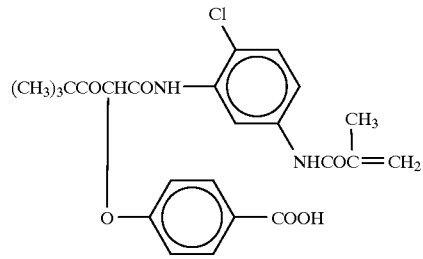
Y-17
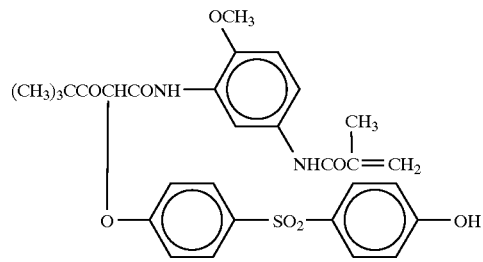
Y-18
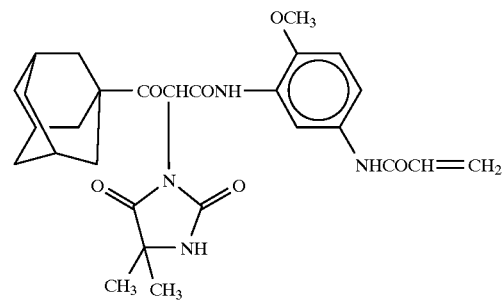
Y-19
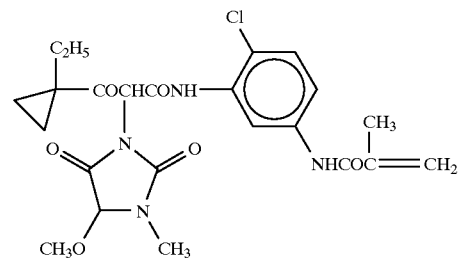

-continued
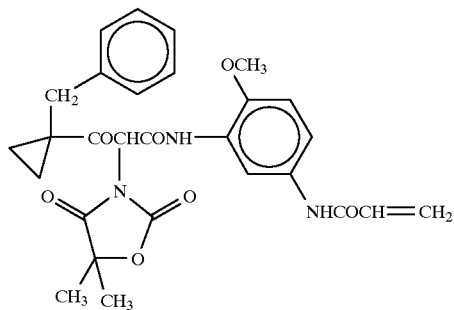
Y-20
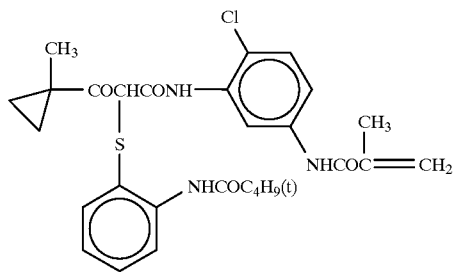
Y-21
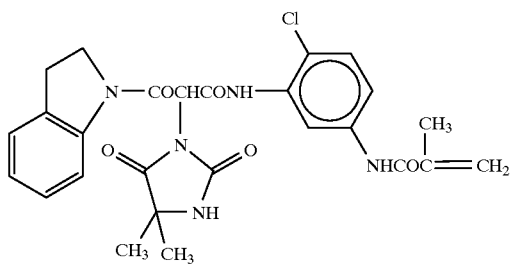
Y-22
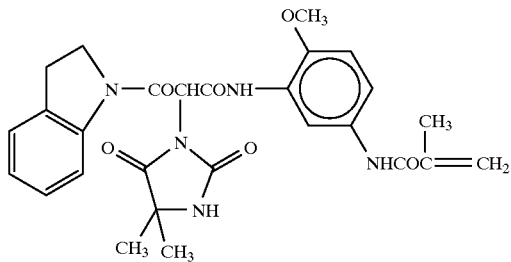
Y-23
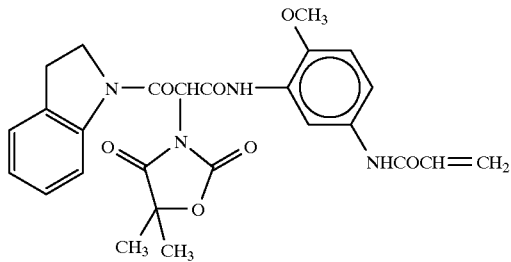
Y-24

-continued
Y-25
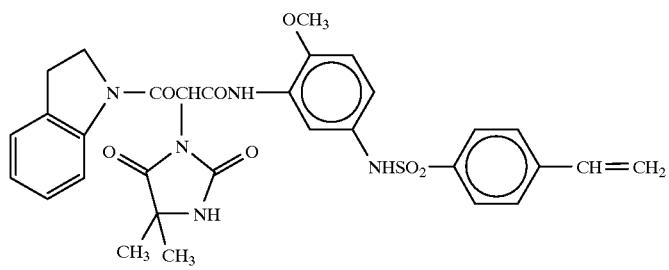
Y-26
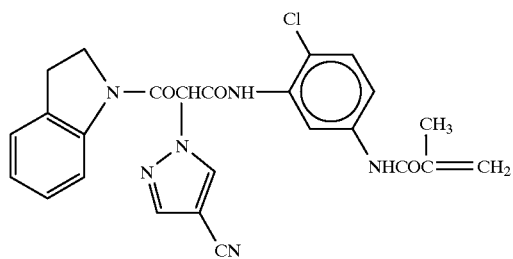
Y-27
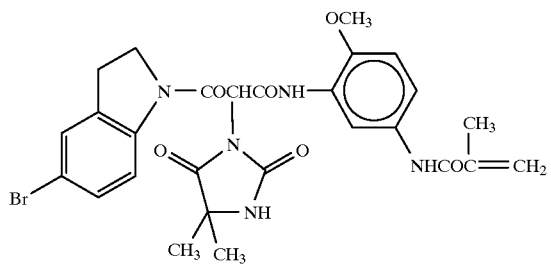
Y-28
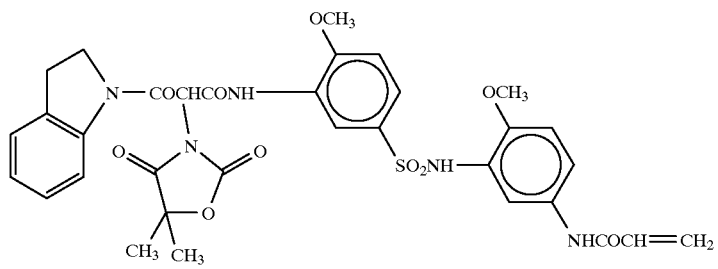
Y-29
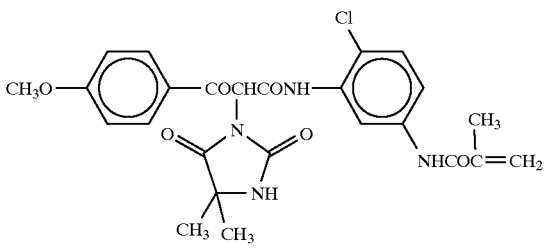
Y-30
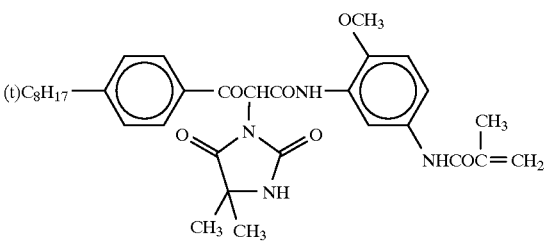

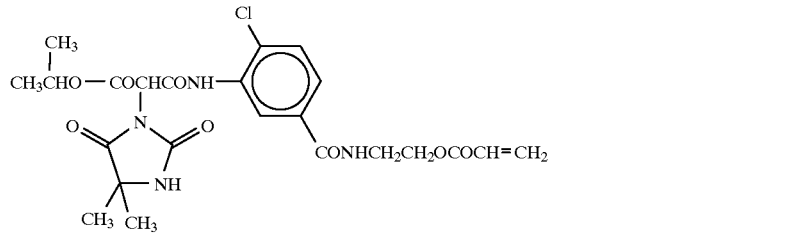
Y-31
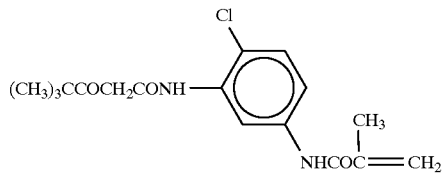
Y-32
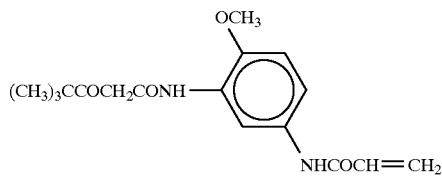
Y-33
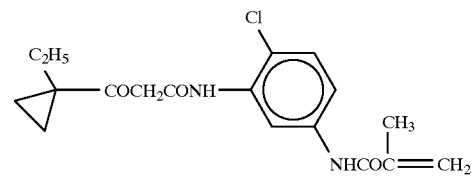
Y-34
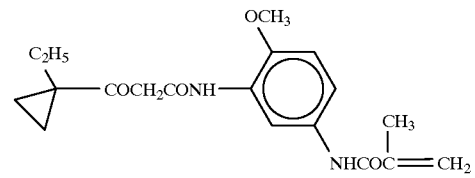
Y-35
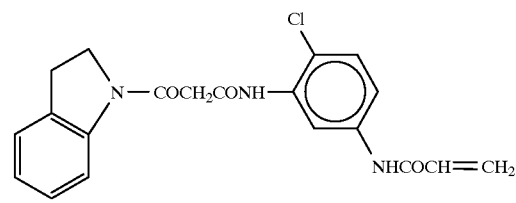
Y-36
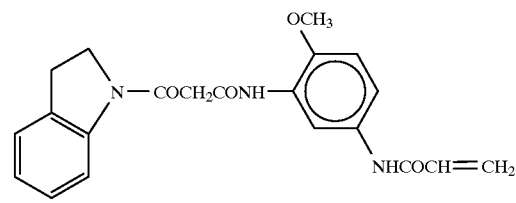
Y-37

Y-38
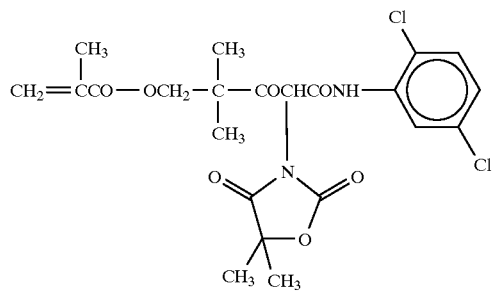
Y-39
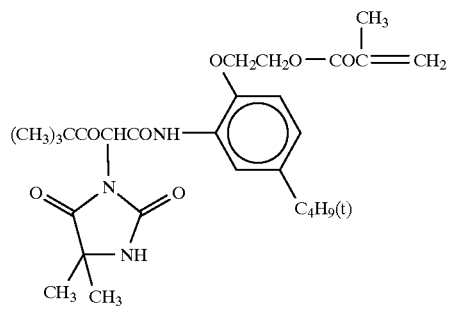
Y-40
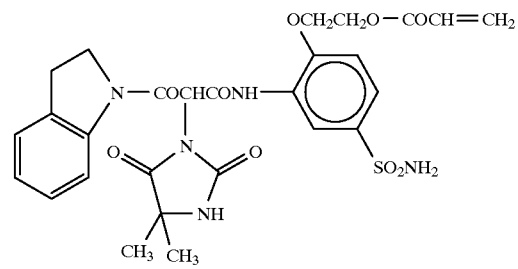
Specific examples of the cyan coupler monomers for use in the present invention are shown below, but the invention should not be construed as being limited thereto.
C-1
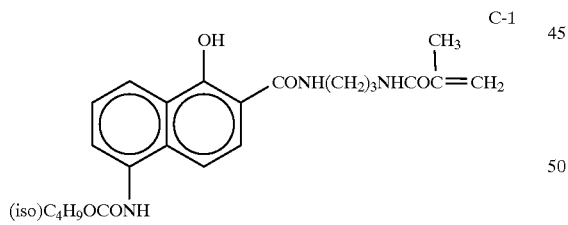
C-2
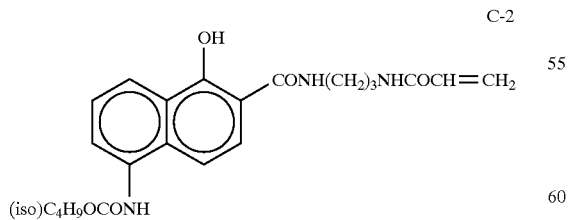
-continued
C-3
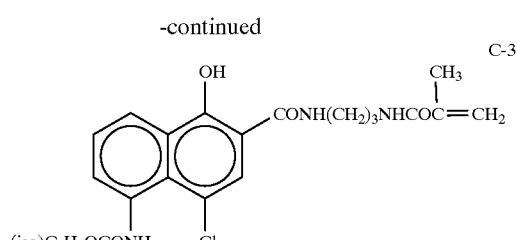
C-4
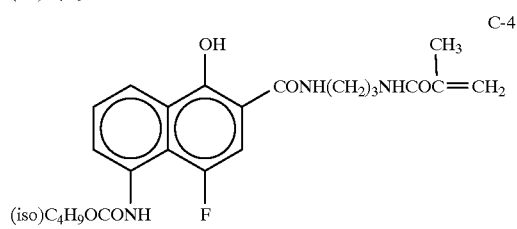
C-5
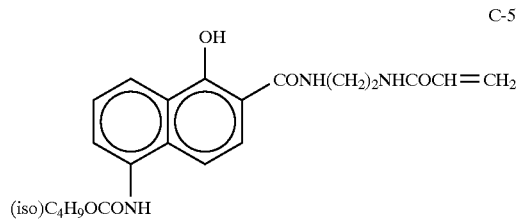

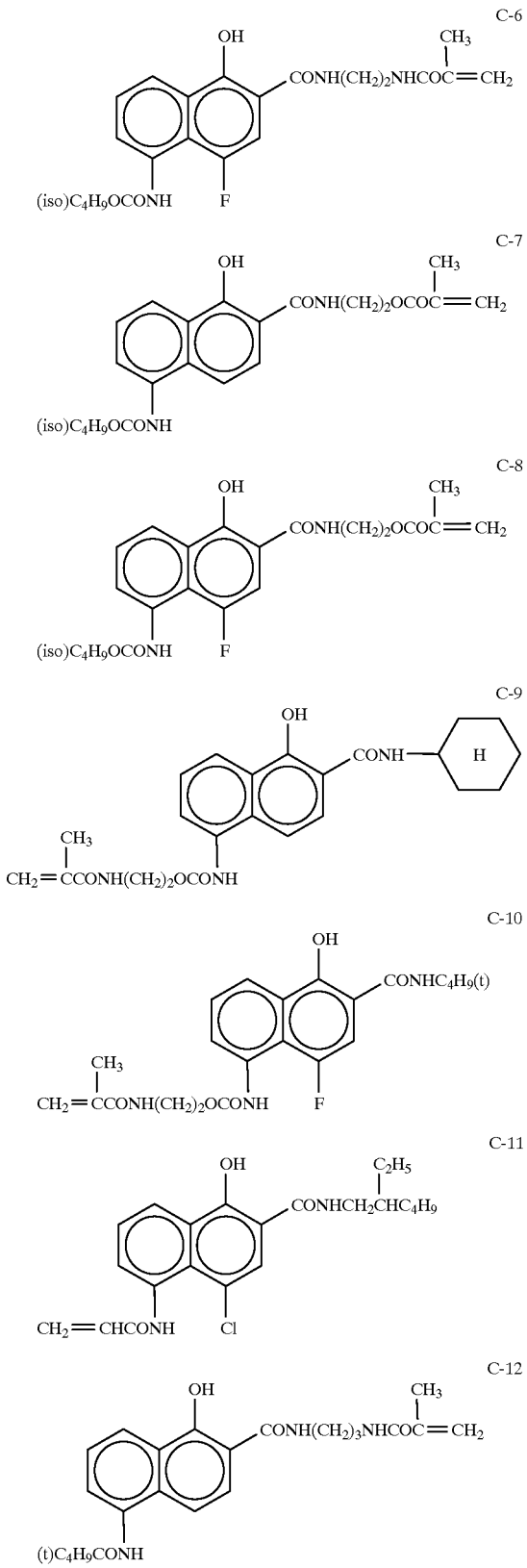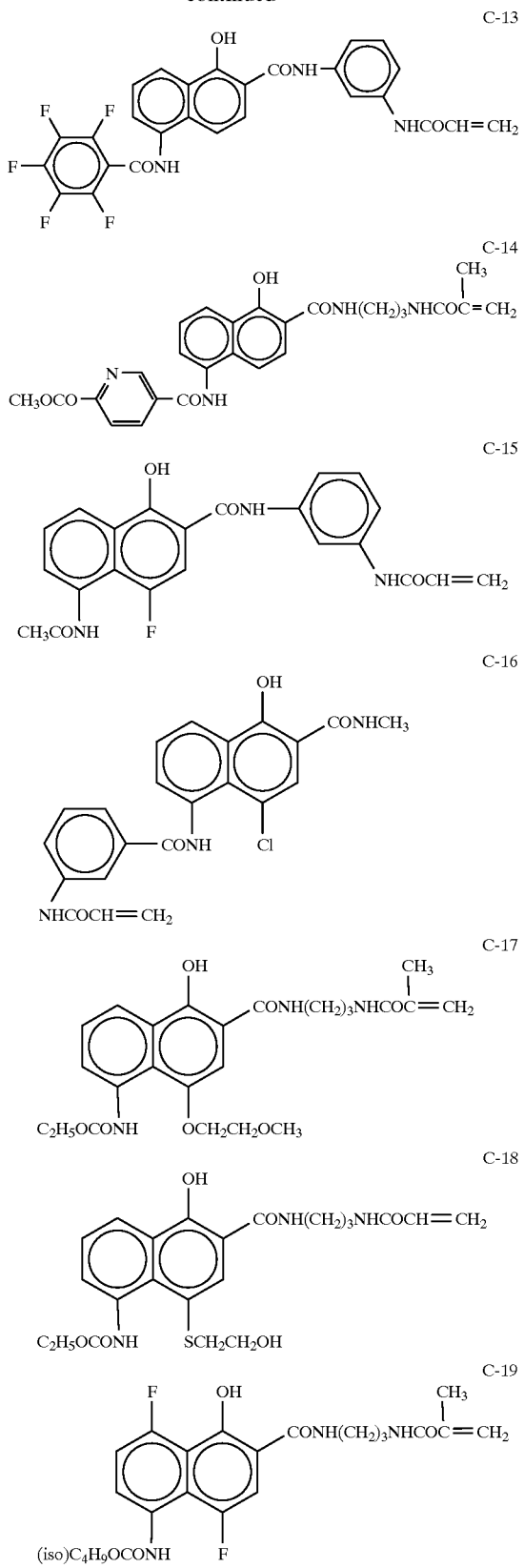

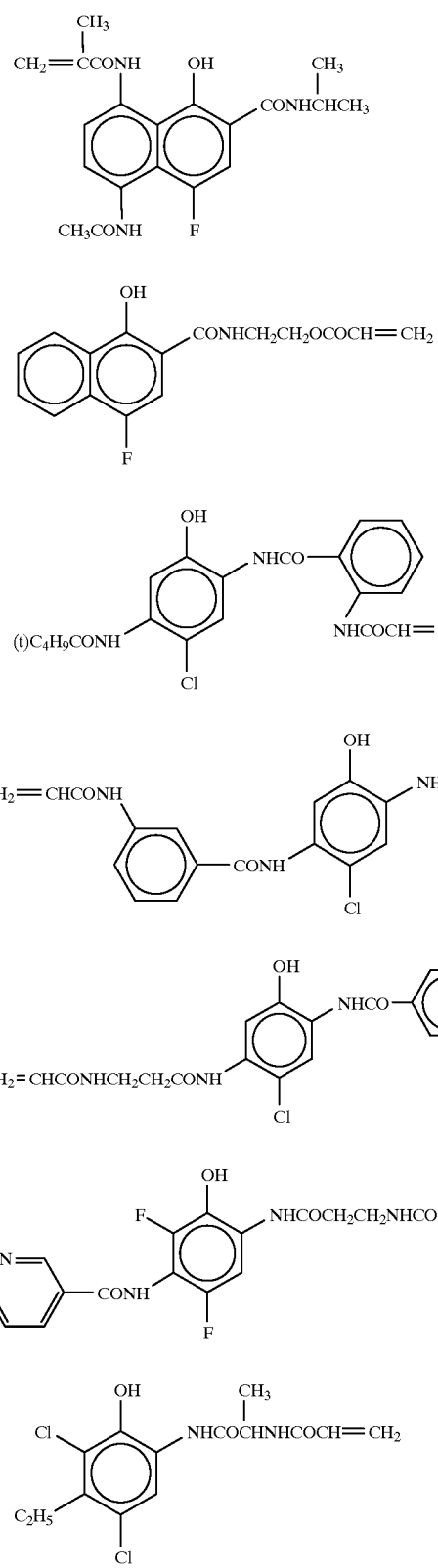
Suitable examples of the non-color-forming ethylenic monomer incapable of coupling with an oxidized product of an aromatic amine include acrylic acid, α-chloroacrylic acid, α-alkylacrylic acids (e.g., methacrylic acid) and esters and amides derived from these acrylic acids (e.g., acrylamide, methacrylamide, t-butylacrylamide, 2-acrylamido-2-methylpropanesulfonic acid, methyl acrylate, methyl methacrylate, ethyl acrylate, n-propyl acrylate, isopropyl acrylate, n-butyl acrylate, t-butyl acrylate, n-butyl methacrylate, 2-ethylhexyl acrylate, n-hexyl acrylate, n-octyl acrylate, lauryl acrylate, acetoacetoxyethyl methacrylate, glycidyl methacrylate, methylenebisacrylamide), vinyl esters (e.g., vinyl acetate, vinyl propionate, vinyl laurate), acrylonitrile, methacrylonitrile, aromatic vinyl compounds (e.g., styrene and derivatives thereof (e.g., potassium styrenesulfinate, sodium styrenesulfinate, sodium styrenesulfonate)), vinylidene chloride, vinyl alkyl ethers (e.g., vinyl ethyl ether), maleic acid esters, N-vinyl-2-pyrrolidone, N-vinylpyridine, and 2- and 4-vinylpyridines. In particular, acrylic acid esters, methacrylic acid esters, acrylamides, methacrylamides, styrene and styrene derivatives are preferred.

The polymer coupler for use in the present invention may be soluble or insoluble in water.

The polymer couplers for use in the invention may be prepared by once isolating a lipophilic polymer coupler or telomer coupler obtained by polymerization of coupler monomers, dissolving the coupler in an organic solvent, and emulsifying the coupler solution in a silver halide emulsion. Alternatively, a polymer coupler latex as obtained by emulsion polymerization or a layered polymer coupler latex may be directly added to a silver halide emulsion in gelatin. It is also possible to dissolve an isolated hydrophilic polymer coupler in water or a mixed solvent of water and a water-miscible organic solvent and adding the coupler solution to a silver halide emulsion in gelatin.

The molar ratio of the yellow coupler monomer of formula (I) and the cyan coupler monomer of formula (II) generally ranges from 1:100 to 100:1, preferably 1:10 to 10:1, still preferably 1:5 to 5:1, while varying depending on the absorption coefficient, absorption wavelength, etc. of the dye derived from each coupler monomer.

The proportion of the chromophoric moiety in the polymer coupler is preferably 5 to 90% by weight. The range of 10 to 80% by weight is still preferred from the viewpoint of color reproducibility, color developability and dye stability. The range of 20 to 70% by weight is particularly preferred.

Synthesis methods of the polymer coupler are roughly divided into (i) emulsion polymerization which provides a polymer coupler latex, (ii) seed polymerization which provides a layered polymer coupler latex, and (iii) solution polymerization which provides a lipophilic polymer coupler, a telomer coupler and a hydrophilic polymer coupler. Details of the synthesis and the addition manner of the coupler to an emulsion are described in U.S. Pat. No. 4,080,211 (as for method (i)), JP-A-58-42044 (as for method (ii)), and U.S. Pat. No. 3,451,820, JP-A-62-276548 and JP-A-60-218646 (as for method (iii)).

Polymer coupler latices, layered polymer coupler latices, lipophilic polymer couplers and telomer couplers are preferred. Polymer coupler latices, layered polymer coupler latices and lipophilic polymer couplers are still preferred, with lipophilic polymer couplers being particularly preferred.

The compositions of the polymer couplers synthesized by the inventors are shown in Tables 1 through 6 below, but the invention should not be construed as being limited to these polymer couplers.

In the following tables, the following abbreviations are used in the columns captioned "kind" for non-color-forming monomer:

"MA" is an abbreviation for "methylmethacrylate";

"EA" for "ethylacrylate";

"BA" for "butylacrylate";

"2-EHA" for "2-ethylhexylacrylate";

"MAA" for "methacrylic acid";

"St" for "styrene";

"AAEMA" for "acetoacetoxyethylmethacrylate";

"AMPSN" for "sodium 2-acrylamido-2-methylpropanesulfonate";

"APSN" for "sodium 3-acryloyloxypropanesulfonate";

"GMA" for "glycidylmethacrylate";

"HMDAA" for "hydroxymethyldiacetoacrylamide";

"SSK" for "potassium styrenesulfinate"; and

"SSN" for "sodium styrenesulfinate".

TABLE 1

Liphohilic Polymer Coupler

| Polymer Coupler No. | Yellow Coupler Monomer Kind | Amount (g) | Cyan Coupler Monomer Kind | Amount (g) | Non-color-forming Monomer Kind* | Amount (g) |
|---|---|---|---|---|---|---|
| P-1 | Y-1 | 13.8 | C-1 | 10.0 | BA | 23.8 |
| P-2 | Y-2 | 13.7 | C-1 | 10.0 | BA | 23.7 |
| P-3 | Y-4 | 11.3 | C-1 | 10.0 | BA | 32.9 |
| P-4 | Y-8 | 11.1 | C-1 | 10.0 | BA | 21.1 |
| P-5 | Y-11 | 11.8 | C-1 | 10.0 | BA | 11.4 |
| P-6 | Y-14 | 11.2 | C-1 | 10.0 | EA | 21.2 |
| P-7 | Y-15 | 12.8 | C-1 | 10.0 | MA | 22.8 |
| P-8 | Y-18 | 12.8 | C-1 | 10.0 | BA | 22.8 |
| P-9 | Y-20 | 12.2 | C-1 | 10.0 | BA | 22.2 |
| P-10 | Y-23 | 11.8 | C-1 | 10.0 | BA | 21.8 |
| P-11 | Y-24 | 11.8 | C-1 | 10.0 | BA | 21.8 |
| P-12 | Y-33 | 11.2 | C-1 | 10.0 | 2-EHA | 33.3 |
| P-13 | Y-39 | 10.8 | C-1 | 10.0 | BA | 20.8 |
| P-14 | Y-2 | 14.1 | C-2 | 10.0 | BA | 24.1 |
| P-15 | Y-4 | 11.3 | C-2 | 10.0 | BA | 21.3 |
| P-16 | Y-8 | 11.3 | C-2 | 10.0 | BA | 21.3 |
| P-17 | Y-4 | 10.4 | C-3 | 10.0 | 2-EHA | 20.4 |
| P-18 | Y-8 | 10.4 | C-3 | 10.0 | BA | 20.4 |
| P-19 | Y-3 | 11.8 | C-4 | 10.0 | BA | 50.0 |
| P-20 | Y-4 | 10.6 | C-4 | 10.0 | BA | 20.6 |
| P-21 | Y-8 | 10.7 | C-4 | 10.0 | BA | 20.7 |
| P-22 | Y-13 | 12.1 | C-4 | 10.0 | BA | 22.1 |
| P-23 | Y-15 | 12.5 | C-4 | 10.0 | BA | 11.5 |
| P-24 | Y-18 | 12.3 | C-4 | 10.0 | BA | 22.3 |
| P-25 | Y-19 | 11.0 | C-4 | 10.0 | BA | 21.0 |
| P-26 | Y-22 | 12.0 | C-4 | 10.0 | MA | 22.0 |
| P-27 | Y-24 | 12.0 | C-4 | 10.0 | MA | 22.0 |
| P-28 | Y-4 | 11.8 | C-5 | 10.0 | BA | 21.8 |
| P-29 | Y-8 | 11.8 | C-5 | 10.0 | BA | 21.8 |
| P-30 | Y-4 | 11.4 | C-6 | 10.0 | BA | 21.5 |
| P-31 | Y-4 | 11.4 | C-7 | 10.0 | BA | 21.4 |
| P-32 | Y-8 | 11.4 | C-7 | 10.0 | MA | 10.0 |
|  |  |  |  |  | BA | 10.0 |

TABLE 2

Liphohilic Polymer Coupler

| Polymer Coupler No. | Yellow Coupler Monomer Kind | Amount (g) | Cyan Coupler Monomer Kind | Amount (g) | Non-color-forming Monomer Kind* | Amount (g) |
|---|---|---|---|---|---|---|
| P-33 | Y-20 | 13.2 | C-7 | 10.0 | BA | 23.2 |
| P-34 | Y-23 | 13.2 | C-7 | 10.0 | MAA | 2.3 |
|  |  |  |  |  | BA | 23.2 |
| P-35 | Y-4 | 11.1 | C-8 | 10.0 | BA | 21.1 |
| P-36 | Y-8 | 11.1 | C-8 | 10.0 | BA | 21.1 |

TABLE 2-continued

Liphohilic Polymer Coupler

| Polymer Coupler No. | Yellow Coupler Monomer Kind | Amount (g) | Cyan Coupler Monomer Kind | Amount (g) | Non-color-forming Monomer Kind* | Amount (g) |
|---|---|---|---|---|---|---|
| P-37 | Y-9 | 20.6 | C-8 | 10.0 | BA | 20.6 |
| P-38 | Y-14 | 12.2 | C-8 | 10.0 | BA | 22.2 |
| P-39 | Y-19 | 11.6 | C-8 | 10.0 | BA | 21.6 |
| P-40 | Y-20 | 12.7 | C-8 | 10.0 | BA | 22.7 |
| P-41 | Y-24 | 12.3 | C-8 | 10.0 | BA | 22.3 |
| P-42 | Y-2 | 13.5 | C-9 | 10.0 | BA | 23.5 |
| P-43 | Y-4 | 11.0 | C-9 | 10.0 | BA | 21.0 |
| P-44 | Y-8 | 11.0 | C-9 | 10.0 | BA | 21.0 |
| P-45 | Y-4 | 11.2 | C-10 | 10.0 | BA | 21.2 |
| P-46 | Y-4 | 11.7 | C-12 | 10.0 | BA | 21.7 |
| P-47 | Y-4 | 9.5 | C-13 | 10.0 | BA | 19.5 |
| P-48 | Y-4 | 11.4 | C-11 | 10.0 | BA | 21.4 |
| P-49 | Y-4 | 9.8 | C-14 | 10.0 | BA | 19.8 |
| P-50 | Y-4 | 11.3 | C-15 | 10.0 | BA | 21.3 |
| P-51 | Y-4 | 9.7 | C-17 | 10.0 | BA | 19.7 |
| P-52 | Y-4 | 9.9 | C-19 | 10.0 | BA | 19.9 |
| P-53 | Y-4 | 16.1 | C-1 | 10.0 | BA | 31.5 |
|  |  |  | C-18 | 5.4 |  |  |
| P-54 | Y-1 | 6.7 | C-1 | 10.0 | BA | 22.6 |
|  | Y-24 | 5.9 |  |  |  |  |
| P-55 | Y-1 | 6.7 | C-1 | 10.0 | BA | 14.2 |
|  | Y-24 | 5.9 | C-18 | 5.8 | MA | 14.2 |
| P-56 | Y-4 | 10.3 | C-4 | 10.0 | BA | 19.8 |
|  | Y-24 | 11.4 | C-27 | 7.9 |  |  |
| P-57 | Y-8 | 10.3 | C-4 | 10.0 | — |  |
| P-58 | Y-4 | 10.3 | C-4 | 10.0 | — |  |
|  | Y-24 | 11.4 | C-32 | 13.0 |  |  |

TABLE 3

Polymer Coupler Latex

| Polymer Coupler No. | Yellow Coupler Monomer Kind | Amount (g) | Cyan Coupler Monomer Kind | Amount (g) | Non-color-forming Monomer Kind* | Amount (g) |
|---|---|---|---|---|---|---|
| P-59 | Y-1 | 13.7 | C-1 | 10.0 | BA | 23.7 |
| P-60 | Y-2 | 13.6 | C-1 | 10.0 | BA | 11.8 |
|  |  |  |  |  | MA | 11.8 |
| P-61 | Y-4 | 11.0 | C-1 | 10.0 | 2-EHA | 21.0 |
| P-62 | Y-8 | 11.3 | C-1 | 10.0 | BA | 21.3 |
| P-63 | Y-20 | 12.8 | C-1 | 10.0 | BA | 22.8 |
| P-64 | Y-23 | 12.8 | C-1 | 10.0 | BA | 22.8 |
| P-65 | Y-4 | 11.6 | C-2 | 10.0 | BA | 21.6 |
|  | Y-4 | 10.4 | C-3 | 10.0 | BA | 20.4 |
| P-66 | Y-4 | 10.8 | C-4 | 10.0 | BA | 20.8 |
| P-67 | Y-8 | 10.8 | C-4 | 10.0 | BA | 20.8 |
| P-68 | Y-4 | 10.8 | C-4 | 10.0 | BA | 13.0 |
|  |  |  |  |  | St | 7.0 |
| P-69 | Y-4 | 12.1 | C-5 | 10.0 | EA | 22.1 |
| P-70 | Y-4 | 21.2 | C-6 | 10.0 | MA | 21.2 |
| P-71 | Y-4 | 16.6 | C-7 | 10.0 | BA | 26.6 |
| P-72 | Y-4 | 15.9 | C-8 | 10.0 | BA | 19.4 |
| P-73 | Y-4 | 12.6 | C-30 | 10.3 | BA | 22.6 |
| P-74 | Y-4 | 7.9 | C-32 | 10.0 | EA | 17.9 |

TABLE 4

Telomer Coupler

| Polymer Coupler No. | Chain Transfer Agents Kind | Amount (g) | Yellow Coupler Monomer Kind | Amount (g) | Cyan Coupler Monomer Kind | Amount (g) | Non-color-forming Monomer Kind | Amount (g) |
|---|---|---|---|---|---|---|---|---|
| P-75 | $C_{12}H_{25}SH$ | 8.0 | Y-1 | 14.0 | C-1 | 10.0 | BA | 16.0 |
| P-76 | $C_{12}H_{25}SH$ | 8.0 | Y-4 | 11.3 | C-1 | 10.0 | BA | 10.6 |
| P-77 | $C_{14}H_{29}SH$ | 8.0 | Y-8 | 11.3 | C-1 | 10.0 | BA | 10.6 |
| P-78 | $C_{12}H_{25}SH$ | 8.0 | Y-20 | 13.4 | C-1 | 10.0 | BA | 13.4 |
| P-79 | $C_{16}H_{33}SH$ | 8.0 | Y-23 | 13.4 | C-1 | 10.0 | BA | 13.4 |
| P-80 | $C_{12}H_{25}SH$ | 10.0 | Y-4 | 11.0 | C-3 | 10.0 | BA | 11.0 |
| P-81 | $C_{14}H_{29}SH$ | 10.0 | Y-4 | 11.3 | C-4 | 10.0 | BA | 11.3 |
| P-82 | $C_{12}H_{25}SH$ | 10.0 | Y-8 | 11.3 | C-4 | 10.0 | BA | 11.3 |
| P-83 | $C_{12}H_{25}SH$ | 10.0 | Y-8 | 12.2 | C-7 | 10.0 | BA | 12.2 |
| P-84 | $C_{12}H_{25}SH$ | 10.0 | Y-8 | 11.7 | C-8 | 10.0 | BA | 11.7 |
| P-85 | $C_{12}H_{25}SH$ | 10.0 | Y-8 | 11.5 | C-9 | 10.0 | BA | 11.5 |
| P-86 | $C_{12}H_{25}SH$ | 10.0 | Y-8 | 12.3 | C-12 | 10.0 | BA | 22.3 |
| P-87 | $C_{12}H_{25}SH$ | 10.0 | Y-8 | 9.7 | C-13 | 10.0 | BA | 9.7 |
| P-88 | $C_{14}H_{29}SH$ | 10.0 | Y-8 | 15.7 | C-27 | 10.0 | BA | 15.7 |

TABLE 5

Layered Polymer Coupler Latex

| Polymer Coupler No. | Seed Monomer Kind | Amount (g) | Yellow Coupler Monomer Added Later Kind | Amount (g) | Cyan Coupler Monomer Added Later Kind | Amount (g) | Non-color-forming Monomer Added Later Kind | Amount (g) |
|---|---|---|---|---|---|---|---|---|
| P-89 | BA | 10 | Y-2 | 13.9 | C-1 | 10.0 | BA | 13.9 |
| P-90 | EA | 10 | Y-4 | 11.3 | C-1 | 10.0 | EA | 11.3 |
| P-91 | BA | 5 | Y-8 | 11.3 | C-1 | 10.0 | BA | 16.3 |
| P-92 | BA | 10 | Y-4 | 10.9 | C-3 | 10.0 | BA | 10.9 |
| P-93 | BA | 10 | Y-8 | 10.9 | C-3 | 10.0 | BA | 10.9 |
| P-94 | BA | 10 | Y-4 | 10.8 | C-4 | 10.0 | BA | 10.8 |
| P-95 | BA | 10 | Y-8 | 10.8 | C-4 | 10.0 | BA | 10.8 |
| P-96 | MA | 5 | Y-4 | 11.6 | C-7 | 10.0 | BA | 16.6 |
| P-97 | BA | 10 | Y-4 | 11.1 | C-8 | 10.0 | BA | 11.1 |
| P-98 | BA | 5 | Y-4 | 11.0 | C-9 | 10.0 | BA | 16.0 |
| P-99 | BA | 10 | Y-4 | 11.7 | C-12 | 10.0 | BA | 11.7 |
| P-100 | BA | 10 | Y-4 | 10.2 | C-17 | 10.0 | BA | 10.2 |

TABLE 6

Hydrophilic Polymer Coupler

| Polymer Coupler No. | Yellow Coupler Monomer Kind | Amount (g) | Cyan Coupler Monomer Kind | Amount (g) | Non-color-forming Monomer Kind* | Amount (g) |
|---|---|---|---|---|---|---|
| P-101 | Y-2 | 14.5 | C-1 | 10.0 | AMPSN | 24.5 |
|  |  |  |  |  | SSK | 2.5 |
| P-102 | Y-4 | 11.8 | C-1 | 10.0 | HMDAA | 21.8 |
| P-103 | Y-8 | 11.8 | C-1 | 10.0 | AAEMA | 21.8 |
| P-104 | Y-4 | 11.3 | C-4 | 10.0 | APSN | 21.3 |
|  |  |  |  |  | GMA | 2.1 |
| P-105 | Y-8 | 11.3 | C-4 | 10.0 | SSN | 21.3 |
|  |  |  |  |  | AAEMA | 2.1 |
| P-106 | Y-4 | 12.6 | C-5 | 10.0 | HMDAA | 22.6 |
|  |  |  |  |  | SSK | 2.3 |

The polymer coupler latices exemplified above can be synthesized according to the method described in U.S. Pat. No. 4,080,211. The layered polymer coupler latices exemplified above can be synthesized according to the method described in JP-A-58-42044. Further, the oleophilic polymer couplers, the telomer couplers and the hydrophilic polymer couplers can be synthesized according to the methods described in U.S. Pat. No. 3,451,820, JP-A-62-276548 and JP-A-60-218646.

Silver halide grains for use in the present invention can be silver chloride grains, silver iodochloride grains, silver chlorobromide grains or silver iodochlorobromide grains. The silver halide grains preferably have a chloride content of at least 50 mol %, more preferably at least 80 mol %, and preferably have an iodide content of not more than 2 mol %, more preferably not more than 1 mol %, particularly preferably not more than 0.5 mol %.

The silver halide emulsion for use in the present invention may be those of surface latent image type or those of internal latent image type. The emulsions of the internal latent image type are combined with a nucleating agent or fogging with light, and thereby they are used as a direct reversal emulsion. The crystal structure of emulsion grains may be a uniform structure or a multilayer structure having a different halide composition between the core part and the core-surrounding part. Further, the emulsion grains used may have in their crystal structure an epitaxial junction formed by the fusion of silver halide phases different in halide composition, or by the fusion of a silver halide phase and a different compound phase, e.g., a silver thiocyanate phase, a zinc oxide phase or so on.

As for the high chloride content emulsions which are preferably used in the present invention, the emulsion grains therein can have a structure such that silver bromide-localized phases are present inside and/or the surface of the grains in a layered or non-layered form. In such a localized phase, the bromide content is preferably at least 20 mol %, and more preferably more than 30 mol %. The bromide content in a silver bromide-localized phase can be determined by X-ray diffractiometry or the like. For example, C. R. Berry & S. J. Marino describe the application of X-ray diffractiometry to silver halide grains in *Photographic Science and Technology*, volume 2, page 149 (1955) and ibid., volume 4, page 22 (1957). The bromide-localized phases can be present inside the grains, or at the edges, corners or faces of the grain surface. In particular, it is preferable for those phases to be present at the corners of the grain surface in a condition of epitaxial junction.

To ensure a large specific surface area and a high development activity in spite of the greatest possible reduction of the silver amount used, the silver halide grains preferably have an average grain diameter ranging from 0.05 to 0.9 μm, more preferably from 0.1 to 0.5 μm. In the case of tabular grains, the thickness thereof is preferably from 0.05 to 0.9 μm, and particularly preferably from 0.1 to 0.5 μm.

The silver halide emulsion for use in the present invention may be monodisperse emulsion which are narrow in grain size distribution. The term "monodisperse emulsion" as used herein means, e.g., a silver halide emulsion having a grain size distribution such that at least 80% of the emulsion grain have their grain size within the range of ±30% of its number or weight average grain size. In other words, the emulsion for use in the present invention may be monodisperse silver halide emulsion having a variation coefficient of not more than 20%, especially not more than 15% with respect to grain size distribution.

Alternatively, multidisperse emulsions having a wide grain size distribution may also be used.

The silver halide emulsion for use in the present invention can be prepared using the method described in *Research Disclosure* (abbreviated as "RD", hereinafter), Vol. 176, No. 17643, pp. 22–23, entitled "I. Emulsion preparation and types" (December, 1978), and RD, No. 18716, p. 648 (November, 1979); P. Glafkides, *Chemie et Phisique*

*Photographique*, Paul Montel (1967); G. F. Duffin, *Photographic Emulsion Chemistry*, Focal Press (1966); V. L. Zelikman et al., *Making and Coating Photographic Emulsion*, Focal Press (1964); and so on.

Monodisperse emulsions described in U.S. Pat. Nos. 3,574,638 and 3,655,394, British Patent 1,413,748, etc. are also preferably used.

Further, tabular emulsion grains having an aspect ratio not less than about 5 can be used in the present invention. Such tabular grains can be easily prepared using the method described in Gutoff, *Photographic Science and Engineering*, volume 14, pages 248–257 (1970), U.S. Pat. Nos. 4,434,226, 4,414,310, 4,433,048 and 4,439,520, and British Patent 2,112,157, etc. Also, a mixture of grains having various crystal forms may be used.

The photosensitive silver halide emulsion for use in the present invention are generally chemically sensitized. As the chemical sensitization, known chemical sensitization processes for emulsions of common photosensitive materials, such as a chalcogen sensitization process including a sulfur sensitization process, a selenium sensitization process and tellurium sensitization process, a noble metal sensitization process using gold, platinum, palladium or the like, and a reduction sensitization process, can be employed alone or in combination of two or more thereof, as described, e.g., in JP-A-03-110555 and JP-A-05-241267. Such chemical sensitization can be also carried out in the presence of a nitrogen-containing heterocyclic compound, as described in JP-A-62-253159. Further, an antifoggant described below can be added after completion of the chemical sensitization. Specifically, the addition of an antifoggant can be performed in the ways as described in JP-A-05-45833 and JP-A-62-40446.

The pH during the chemical sensitization is preferably from 5.3 to 10.5, and more preferably from 5.5 to 8.5; while the pAg is preferably from 6.0 to 10.5, and more preferably from 6.8 to 9.0.

The coating amount of photosensitive silver halide emulsion for use in the present invention is from 1 mg/m$^2$ to 10 g/m$^2$ in terms of silver.

To impart color sensitivities including green sensitivity, red sensitivity and infrared sensitivity to the photosensitive silver halide for use in the present invention, the photosensitive silver halide emulsion are spectrally sensitized with methine dyes or other dyes. Further, a photosensitive silver halide emulsion may be spectrally sensitized in a blue-region to be rendered blue-sensitive, if needed.

The dyes used for the above described purpose include cyanine dyes, merocyanine dyes, complex cyanine dyes, complex merocyanine dyes, holopolar cyanine dyes, hemicyanine dyes, styryl dyes and hemioxonol dyes.

Specific examples of such dyes are the spectral sensitizing dyes recited in U.S. Pat. No. 4,617,257, JP-A-59-180550, JP-A-64-13546, JP-A-05-45828, JP-A-05-45834, etc.

These sensitizing dyes may be employed individually or in combination of two or more thereof. In particular, combinations of sensitizing dyes are often used for supersensitizing or for adjusting the intended spectral sensitization wavelengths.

Dyes which themselves do not spectrally sensitize silver halide emulsions, or compounds which do not substantially absorb light in the visible region, but which each exhibits a supersensitizing effect may be incorporated into silver halide emulsions in combination with the sensitizing dye, as described, e.g., in U.S. Pat. No. 3,615,641 and JP-A-63-23145.

These sensitizing dyes may be added to silver halide emulsion either during, before or after the chemical ripening or, as described in U.S. Pat. Nos. 4,183,756 and 4,225,666, either before or after the nucleation of silver halide grains. Additionally, those sensitizing dyes and supersensitizers may be added in the form of solution dissolved in an organic solvent such as methanol, in the form of dispersion in gelatin, or in the form of solution comprising a surfactant. The addition amount of the sensitizing dyes or supersensitizers is generally about $10^{-8}$ to $10^{-2}$ mol per mole of silver halide.

Additives used during the above described steps and known photographic additives which can be used in the present invention are described in the above-cited RD No. 17643, RD No. 18716 and RD No. 307105. The following is a list of those additives and the locations of their descriptions in the above-cited references.

| Additives | RD 17643 | RD 16716 | RD 307105 |
|---|---|---|---|
| 1. Chemical Sensitizer | p. 23 | p. 648, right column | p. 866 |
| 2. Sensitivity Rising Agent | | p. 646, right column | |
| 3. Spectral Sensitizer, and Supersensitizing Agent | pp. 23–24 | p. 648, right column, to p. 649, right column | pp. 866–868 |
| 4. Brightening Agent | p. 24 | p. 648, right column | p. 868 |
| 5. Antifoggant and Stabilizer | pp. 24–25 | p. 649, right column | pp. 868–870 |
| 6. Light Absorbent, Filter Dye, and UV Absorbent | pp. 25–26 | p. 649, right column, to p. 650, left column | p. 873 |
| 7. Dye Image Stabilizer | p. 25 | p. 650, left column | p. 872 |
| 8. Hardener | p. 26 | p. 651, left column | pp. 874–875 |
| 9. Binder | p. 26 | p. 651, left column | pp. 873–874 |
| 10. Plasticizer, and Lubricant | p. 27 | p. 650, right column | p. 876 |
| 11. Coating Aid, and Surfactant | pp. 26–27 | p. 650, right column | pp. 875–876 |
| 12. Antistatic Agent | p. 27 | p. 650, right column | pp. 876–877 |

A color developing agent for use in the present invention only required to such that its oxidized product generated upon developing a silver halide can undergo a coupling reaction with a coupler to form a dye, and such a compound is well known in the photographic arts. Specific examples of the color developing agent is described, e.g., in T. H. James, *The Theory of the Photographic Process*, 4th ed., pp. 291–334. In particular, p-phenylenediamine derivatives are preferred as the color developing agent.

Known various color couplers can be used in combination with the above described couplers of the present invention, and specific examples of such color couplers are described in the patent gazettes cited in RD, No. 17643, VII-C to VII-G.

In the present invention, two equivalent color couplers having the coupling site thereof substituted with a dissociative group are preferable to four equivalent color couplers whose coupling site has a hydrogen atom for reducing the coating amount of silver.

Suitable yellow couplers which can be used in combination in the present invention typically include oil-protected type acylacetamide couplers, whose specific examples are given in U.S. Pat. Nos. 2,407,210, 2,875,057, and 3,265,506. Two equivalent yellow couplers, which are preferred as mentioned above, typically include yellow couplers of oxygen-release type as described in U.S. Pat. Nos. 3,408,194, 3,447,928, 3,935,501 and 4,022,620; and nitrogen-release type yellow couplers as described in JP-B-58-10739, U.S. Pat. Nos. 4,401,752 and 4,326,024, RD, 18053 (April, 1979), British Patent 1,425,020, and West German Patent OLS Nos. 2,219,917, 2,261,361, 2,329,587, and 2,433,812. In particular, α-pivaloylacetanilide couplers produce dyes having excellent fastness, especially to light, and α-benzoylacetanilide couplers produce dyes exhibiting high developed color density.

Suitable magenta couplers which can be used in combination in this invention include oil-protected couplers, and those of 5-pyrazolone type and those of pyrazoloazole type such as pyrazolotriazoles are preferred. Of the 5-pyrazolone type couplers, those substituted by an arylamino or acylamino group at the 3-position are preferred in view of hue and color density of the dye produced therefrom. Typical examples of such 5-pyrazolone couplers are described in U.S. Pat. Nos. 2,311,082, 2,343,703, 2,600,788, 2,908,573, 3,062,653, 3,152,896, and 3,936,015. Dissociative groups of two equivalent 5-pyrazolone couplers preferably include dissociative groups at the site of nitrogen atom as described in U.S. Pat. No. 4,310,619 and arylthio groups as described in U.S. Pat. No. 4,351,897. Further, 5-pyrazolone couplers having a ballast group as described in European Patent 73,636 provide a high color density.

Suitable pyrazoloazole couplers include pyrazolobenzimidazoles as described in U.S. Pat. No. 3,369,879, preferably pyrazolo[5,1-c][1,2,4]triazoles as described in U.S. Pat. No. 3,725,067, pyrazolotetrazoles as described in RD 24220 (June, 1984), and pyrazolopyrazoles as described in RD 24230 (June, 1984). The imidazo[1,2-b]pyrazoles described in European Patent 119,741 are preferable, and the pyrazolo[1,5-b][1,2,4]triazole described in European Patent 119,860 is particularly preferable because they produce a dye exhibiting slight side absorption in the yellow region and having high fastness to light.

Cyan couplers which can be used in combination in the present invention include naphthol couplers described in U.S. Pat. Nos. 2,474,293, 4,052,212, 4,146,396, 4,228,233, and 4,296,200; phenol couplers having an alkyl group containing 2 or more carbon atoms at the m-position of the phenol nucleus described in U.S. Pat. No. 3,772,002; 2,5-diacylamino-substituted phenol couplers described in U.S. Pat. Nos. 2,772,162, 3,758,308, 4,126,396, 4,334,011 and 4,327,173, West German Patent Publication OLS No. 3,329,729, and JP-B-3-18175; and phenol couplers having a phenylureido group at the 2-position and an acylamino group at the 5-position described in U.S. Pat. Nos. 3,446,622, 4,333,999, 4,451,559 and 4,427,767. Carbostyryl couplers described in JP-A-7-294714 are preferably used because of its excellent resistance to heat and light.

In addition to these couplers, the following various couplers can be used in the present invention.

Typical examples of polymerized dye-forming couplers are described in U.S. Pat. Nos. 3,451,820, 4,080,211 and 4,367,282, and British Patent 2,102,173.

Couplers capable of releasing a photographically useful residue upon coupling are also preferably used. Examples of suitable DIR couplers which release a development inhibitor are described in the patents cited in the above described RD No. 17643, items VII-F, JP-A-57-151944, JP-A-57-154234, JP-A-60-184248, and U.S. Pat. No. 4,248,962.

Examples of couplers which imagewise release a nucleating agent or a development accelerator at the time of development are described in British Patents 2,097,140 and 2,131,188, JP-A-59-157638 and JP-A-59-170840.

Other couplers which can also be used in the photosensitive material of the present invention include competing couplers described in U.S. Pat. No. 4,130,427; polyequivalent couplers described in U.S. Pat. Nos. 4,283,472, 4,338,393 and 4,310,618; couplers capable of releasing a DIR redox compound described in JP-A-60-185950; and couplers capable of releasing a dye which restores its color after release described in EP-A-173,302.

The coupler for black color compensation includes those developing a yellow, magenta or cyan color, but those developing a brown, orange, purple or black color are also included as examples thereof.

The equivalent ratio of a silver halide to the polymer coupler of the present invention in each silver halide emulsion layer is from 0.5 to 100, preferably from 1 to 10, still preferably from 1 to 3. Particularly, the equivalent ratio is preferably from 1 to 2 in the case of using a silver halide emulsion having an average grain size (or a grain thickness for tabular grains) of not more than 0.9 μm, especially not more than 0.5 μm. The expression "equivalent ratio" as used herein has the following meaning: The theoretical amount of silver halide necessary for color-developing all the couplers present in an emulsion layer is defined as the case in which the equivalent ratio is 1. Accordingly, if the amount of silver halide coated is twice the theoretical amount, the value of 2 is given for the equivalent ratio. More specifically, when the coated silver amount is two mol per mol of a two equivalent coupler, the equivalent ratio is 1; while the equivalent ratio is 2 when the amount of coated silver is four mol per mol of a two equivalent coupler.

The above-recited couplers for use in combination in the present invention can be incorporated into a photosensitive material according to known various dispersion methods.

Examples of a high boiling solvent used in oil-in-water dispersion methods are described, e.g., in U.S. Pat. No. 2,322,027. The suitable amount of a high boiling solvent is generally not higher than 10 g, preferably not higher than 5 g, and more preferably from 1 g to 0.1 g, per gram of couplers. To 1 g of a binder, on the other hand, it is appropriate to use not more than 2 g, preferably not more than 1 g, particularly preferably not more than 0.5 g, of a high boiling solvent. The size of oil particles in a coupler dispersion (coupler emulsion) obtained by an oil-in-water dispersion method generally ranges from 0.05 μm to 0.9 μm, preferably 0.1 μm to 0.5 μm.

The processes and effects of a latex dispersion method as well as specific examples of a latex used for impregnation are described, e.g., in U.S. Pat. No. 4,199,363 and West German Patent Applications (OLS) 2,541,274 and 2,541,230.

In coupler-containing layers of the photosensitive material of the present invention, it is desirable to use the compounds which improves color image stability as described in EP-A2-0277589. In particular, these compounds are preferably used in combination with pyrazoloazole type magenta couplers.

That is, compounds of the kind which produces chemically inert, substantially colorless compounds by reacting with an aromatic amine developing agent remaining after the color development-processing (Compound F) and/or compounds of the kind which produces chemically inert, substantially colorless compounds by reacting with an oxidized product of an aromatic amine developing agent remaining after the color development-processing (Compound G) are preferably used in combination or independently. By the use of these compounds, the generation of stains, which are due to the formation of coloring dyes through the reaction between the couplers and the unoxidized or oxidized color developing agent remaining in the processed photographic film, and the occurrence of other side reactions upon storage after photographic processing, can be inhibited effectively.

In silver halide emulsion layers, interlayers, etc. of the photosensitive material of the present invention, hydroquinone derivatives, aminophenol derivatives, gallic acid derivatives, ascorbic acid derivatives and the like may be contained as a color fog inhibitor or a color mixing inhibitor. Of these compounds, those which hardly generate stains even when they are heated up to 160–220° C. are preferred.

To prevent a cyan dye image from deteriorating due to heat and light, particularly light, it is more effective to incorporate an ultraviolet absorbent in the cyan color-forming layer and the layers provided on both upper and lower sides thereof.

Examples of the ultraviolet absorbent for use in the present invention include aryl-substituted benzotriazole compounds (e.g., those described in U.S. Pat. No. 3,533, 794), 4-thiazolidone compounds (e.g., those described in U.S. Pat. Nos. 3,314,794 and 3,352,681), benzophenone compounds (e.g., those described in JP-A-46-2784), cinnamate compounds (e.g., those described in U.S. Pat. Nos. 3,705,805 and 3,707,395), butadiene compounds (e.g., those described in U.S. Pat. No. 4,045,229), and benzoxazole compounds (e.g., those described in U.S. Pat. Nos. 3,406, 070 and 4,271,307). In addition, ultraviolet absorbing couplers (such as cyan dye-forming couplers of α-naphthol type) and ultraviolet absorbing polymers may be used. These ultraviolet absorbents may be mordanted to a particular layer. of these ultraviolet absorbents, the aryl-substituted benzotriazole compounds are preferred.

Further, the antimolds described in JP-A-63-271247 is preferably added to the photosensitive material of the present invention to prevent various kinds of molds and bacteria from propagating in hydrophilic colloid layers to thereby inhibit image deterioration.

Gelatin is advantageously used as a binder or a protective colloid in silver halide emulsion layers, intermediate layers and protective layers of the photosensitive material of the present invention. Other hydrophilic polymers may also be used as well. Examples of the hydrophilic polymer include polyvinyl alcohol, polyvinyl alcohol partial acetal, polyvinyl butyral, poly-N-vinylpyrrolidone, polyacrylic acid, polyacrylamide, polyvinylimidazole, polyvinylpyrazole, carrageenan, gum arabic, and homo- or co-polymers of cellulose derivatives, e.g., a hydroxyalkyl cellulose, carboxymethyl cellulose, cellulose sulfate, cellulose acetate hydrogen phthalate and sodium alginate.

Graft polymers of gelatin and other polymers are also useful. Examples of the gelatin graft polymer include gelatin having grafted thereto a homo- or co-polymer of vinyl monomers such as acrylic acid or methacrylic acid or a derivative thereof (e.g., esters or amides), acrylonitrile, and styrene. Graft polymers of gelatin and polymers having compatibility with gelatin to some extent (such as a polymer of acrylic acid, methacrylic acid, acrylamide, methacrylamide or a hydroxyalkyl methacrylate) are preferred. Examples of these gelatin graft polymers are described in U.S. Pat. Nos. 2,763,625, 2,831,767 and 2,956,884 and JP-A-56-65133.

Typical synthetic hydrophilic polymers that are useful as binders are described in West German Patent (OLS) No. 2,312,708, U.S. Pat. Nos. 3,620,751 and 3,879,205, and JP-B-43-7561.

The above-described hydrophilic polymers can be used either individually or as a combination of two or more thereof.

Gelatin species which can be used include alkali-processed gelatin, acid-processed gelatin, enzyme-processed gelatin and mixtures thereof. Gelatin derivatives obtained by reacting gelatin with various compounds, such as acid halides, acid anhydrides, isocyanates, bromoacetic acid, alkane sultones, vinylsulfonamides, maleinimide compounds, polyalkylene oxides and epoxy compounds, are also useful. Examples of the gelatin derivative are given in U.S. Pat. Nos. 2,614,928, 3,132,945, 3,186,846 and 3,312, 553, British Patents 861,414, 1,033,189, and 1,005,784, and JP-B-42-26845.

The total amount of the binder for use in the photosensitive material is preferably from 3 to 10 g/m$^2$. A binder content of each layer, e.g., a silver halide emulsion layer or an intermediate layer, is preferably from 0.1 to 1.5 g/m$^2$, particularly preferably from 0.2 to 1.0 g/m$^2$.

The support for use in the invention is preferably light-transmitting substrate. Where photosensitive emulsion layers are provided on a separate substrate (temporary support) and then transferred to adhere onto a light-transmitting substrate as described in JP-A-7-244212, the temporary support are not necessarily required to be light-transmitting. For example, a substrate having a back layer comprising carbon black can be used. In this type of photosensitive material, the amount of binders used in a peeling layer and/or the back layer is excluded from the "total amount of the binder" as referred to above.

Light-transmitting materials being optically isotropic and having excellent heat resistance, such as polyethylene terephthalate, polybutylene terephthalate, polyethylene naphthalate, polystyrene, polycarbonate, polyether sulfone, cellulose acetate, polyarylate, soda glass, borosilicate glass and quartz, are suitable as the light-transmitting substrate.

If desired, the surface of the substrate made of the above material may be coated with a subbing layer and may further be subjected to a surface treatment, such as a glow discharge treatment, a corona discharge treatment or ultraviolet irradiation.

The light-transmitting substrate can be used in the form of a plate, a sheet or a film. While arbitrarily selected according to the end use or the kind of the material, the thickness of the substrate generally ranges from 0.01 to 10 mm. For example, the thickness is within the range of from 0.3 to 3 mm in the case of glass substrate.

The polymer coupler according to the invention can be used in any layer of general negative or positive color photographic materials which contain a yellow coupler in the blue-sensitive emulsion layer, a magenta coupler in the green-sensitive emulsion layer, and a cyan coupler in the red-sensitive emulsion layer. The polymer coupler of the invention can also be used in photosensitive materials having the following embodiments (I) and (II).

Figure 2:
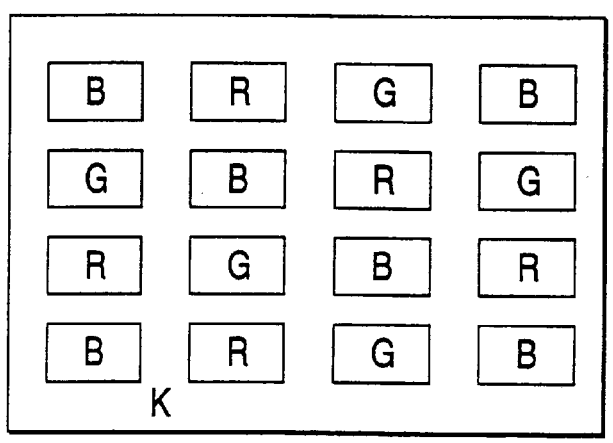
FIG. 2 is a scheme showing an embodiment of the RGB color filter according to the present invention.

(I) An embodiment of the silver halide photosensitive material of the present invention comprises a support having provided thereon a blue-sensitive emulsion layer, a green-sensitive emulsion layer, and a red-sensitive emulsion layer each comprising materials exhibiting the characteristic curve shown in FIG. 1, in which the blue-sensitive emulsion layer contains a cyan coupler and a magenta coupler (or a blue coupler), the green-sensitive emulsion layer contains the polymer coupler of the invention comprising a yellow coupler component and a cyan coupler component, and the red-sensitive emulsion layer contains a yellow coupler and a magenta coupler (or a red coupler). The photosensitive material of this type is exposed to red light, green light, blue light and white light, respectively, using the respective four mask filters each having such a pattern that gives exposures of point A and point B of FIG. 1 (these mask filters have light-transmitting areas corresponding, respectively, to red pixels, green pixels, blue pixels and black matrix of a desired color filter) and color screens in conformity to the spectral sensitivities of each color-sensitive layer. The exposed photosensitive material is then subjected to color development, desilverizing and washing to provide a color filter consisting of red pixels, green pixels, blue pixels, and a black matrix as shown in FIG. 2.

(II) Another embodiment of the silver halide photosensitive material of the present invention has the same layer structure as in structure (I) except for additionally having an infrared-sensitive emulsion layer containing a coupler for color correction designed to provide a substantially black color having a transmission density of 2.5 or higher (END$\geq$2.5) upon reaction of all the couplers present on the support. The infrared-sensitive emulsion layer may be made up of two or more unit layers. An appropriate choice of the layer structure for each unit layer and of the coupler to be incorporated makes it possible to omit the intermediate layer between the infrared-sensitive layer and the other silver halide emulsion layers adjacent thereto. The coupler for color correction may be the same as or different from the couplers used in the red, green or blue-sensitive emulsion layers. The photosensitive material of this type is exposed to red light, green light, blue light and white light (including requisite infrared light), in the same manner as in the above embodiment (I) using four mask filters as shown in FIG. 3 and color screens each in conformity to the spectral sensitivity of the respective photosensitive layers, and then color-developed, desilverized and washed to provide a color filter comprising red pixels, green pixels, blue pixels and a high-density black matrix as shown in FIG. 2.

In embodiments (I) and (II), combination of color sensitivity is not limited to the above described combination of blue sensitivity, green sensitivity, red sensitivity and infrared sensitivity, and the combination may also include ultraviolet sensitivity or yellow sensitivity. The infrared sensitivity may have two or more sensitive wavelengths. The order of forming silver halide emulsion layers of different color sensitivity is not limited to the above-described one and can be selected arbitrarily. If desired, the photosensitive materials in the above described embodiments (I) and (II) may further have additional layers, such as a subbing layer, an intermediate layer, a bleachable yellow filter layer, a protective layer, and an ultraviolet absorbing-layer. In the present invention, embodiments (I) and (II) are preferably used for their excellent color reproducibility.

A micro color filter is obtained by subjecting the photosensitive material of the invention to color development process in a conventional manner as described in RD No. 17643, pp. 28–29 and RD No. 18716, p. 651, left to right columns.

For example, processing comprising color development, desilverizing and washing is performed. In the desilverizing step, a bleach-fix processing step using a blix solution can be carried out instead of a bleach-processing step using a bleaching solution and a fixation-processing step using a fixing solution, or all of a bleach-processing step, a fixation-processing step and a bleach-fix processing step may be performed in an arbitrary order. A stabilizing step may be carried out instead of a washing step, or it may be carried out after the washing step. Further, a monobath processing step, in which color development, bleach and fixation operations are performed in a monobath using a developing, bleaching and fixing processing solution, can be carried out. In combination with these processing steps, a prehardening step, a neutralizing step therefor, a stop-fix processing step, an afterhardening step, an adjustment step, an intensification step and so on may be carried out. In these processing processes, the so-called activator processing step may be carried out instead of a color-development processing step.

As described in JP-A-7-159610, the color development processing and the desilverizing processing may be carried out using an autopositive emulsion of internal latent image type in combination with a nucleating agent and fogging with light.

Where the substrate of the photosensitive material is flexible, a developing apparatus used for ordinary photographic processing can be used. Where the substrate is a hard one (e.g., a glass plate), a developing apparatus for dry plates or the apparatus described in JP-A-7-56015 can be used.

Exposure is carried out by a face exposure system through a mask or a scanning exposure system. The scanning exposure system applicable to the present invention includes a point scanning system by line (slit) scanning or laser exposure. Examples of light sources include a tungsten lamp, a halogen lamp, a fluorescent tube (three-wavelength fluorescent lamp), a mercury lamp, a laser beam and a light-emitting diode. A halogen lamp, a fluorescent lamp and a laser beam are preferred.

In another exposure system applicable to the photosensitive material of the invention, the photosensitive material is exposed three times using a liquid crystal display panel, into which the color filter prepared by the invention is to be incorporated, in combination with a color screen as disclosed in JP-A-8-201616.

The color filter produced according to the method of the present invention can have a protective layer (or an overcoat layer) comprising a heat-resistant, water-resistant, and electrically highly resistive resin as the outermost layer. Examples of such a resin are described in U.S. Pat. Nos. 4,698,295 and 4,668,601, EP-A-179636, EP-A-556810, JP-A-3-163416, JP-A-3-188153, JP-A-5-78443, JP-A-1-276101, JP-A-60-216307 and JP-A-63-218771.

The color filter according to the method of the present invention can also be provided with a transparent electrode of indium-tin oxide (ITO) by vacuum coating, for example, vacuum evaporation or sputtering. An orientation film comprising a polyimide resin, etc. can further be provided thereon. Further, the transparent substrate of the color filter may be provided with a polarizing plate and a phase contrast film on the side opposite the emulsion side.

A color liquid crystal display (LCD) using the color filter of the present invention is described below.

Figure 4:
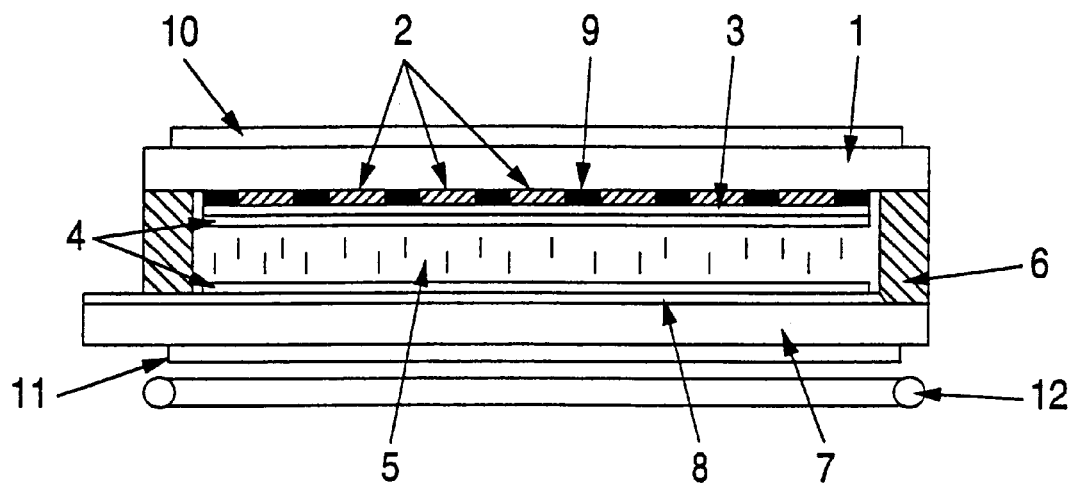
FIG. 4 is a vertical sectional view of an embodiment of color liquid crystal displays (LCD) using the present color filter.

A vertical sectional view of an embodiment of the liquid crystal display is shown in FIG. 4. The color filter 2 produced in accordance with an embodiment of the present invention is provided on a glass substrate 1. On the surface of the color filter 2, a protective layer is formed by coating with the above described resin, though it is not shown in the figure. Onto the protective layer, a transparent electrode 3 (e.g., an ITO electrode) is attached using a vacuum filming apparatus. The transparent electrode 3 is made in the form of monolithic electrode covering the entire surface in the case of an active matrix driven LCD using a tree-terminal switching array, such as TFT, while it is generally made in the form of stripe electrode in the cases of a simple matrix driven LCD and an active matrix drive LCD using a two-terminal switching array, such as MIM. On this transparent electrode 3 is arranged an orientation layer 4 composed of polyimide or the like for orientating liquid crystal molecules.

The glass substrates 1 is assembled with another glass substrate 7 having similarly provided thereon a transparent electrode 8 (e.g., ITO electrode) and an orientation layer 4 in this order, into a liquid crystal cell with spaces (not shown) and sealing material 6 therebetween. The transparent electrode 8 is a pixel electrode connected with TFT elements in the case of an active matrix driven LCD using a three-terminal switching array, such as TFT, while it is generally a stripe electrode in the case of a simple matrix driven LCD using a STN liquid crystal. In the latter case, the stripes of transparent electrodes 3 and 8 is arranged so as to cross at right angles.

A black matrix 9 is generally formed between every two of R, G and B pixels for improving contrast and color purity. The black matrix 9 can be formed simultaneously with R, G and B pixels as in the present invention. Alternatively, a Cr or carbon film can be formed as the black matrix separately from the formation of those pixels. Further, the glass substrates 1 and 7 are provided with polarizing plates 1 and 11, respectively, on their respective back sides. In addition, it is possible to insert a phase compensation film (which is not shown in the figure) between each pair of a glass substrate and a polarizing plate.

Since LCD using a color filter has a small light transmission, back light 12 having conformity with the color filter with respect to color reproduction is generally placed.

The glass substrate as a light-transmitting substrate may be displaced with a plastic film substrate having a gas barrier layer or a hard coating layer.

Details of color LCD and production methods thereof are described, e.g., in Shoich Matsumoto and Ichiyoshi Kadota, Ekisho no Kiso to Ovo (Fundamentals and Application of Liquid Crystals), Kogyo Chosakai (1991), Flatpanel Display 1994, compiled by Nikkei Micro Device and published by Nikkei BP (1993), and JP-A-1-114820.

The present invention will be described in more detail with reference to the following Examples, but the invention should not be construed as being limited thereto.

COMPARATIVE EXAMPLE 1

A photosensitive silver halide emulsion (Emulsion (I)) was prepared in the following manner:

To a well-agitated aqueous gelatin solution having the composition shown in Table 7, a solution (Soln. (I)) shown in Table 8 was added for 1 minutes. After a lapse of 20 seconds from the start of the addition of Soln. (I), another solution (Soln. (II)) shown in Table 8 was added for 40 seconds. Two minutes after, other solutions (Soln. (III) and Soln. (IV)) shown in Table 8 were added simultaneously for 4 minutes.

TABLE 7

| Composition of aqueous gelatin solution | |
|---|---|
| H₂O | 650 ml |
| Lime-processed gelatin | 20 g |
| NaCl | 3 g |
| Silver halide solvent (1) | 0.015 g |
| Temperature kept at | 40° C. |

TABLE 8

| | Soln. (I) | Soln. (II) | Soln. (III) | Soln. (IV) |
|---|---|---|---|---|
| AgNO₃ | 20 g | | 80 g | |
| NaCl | | 4.91 g | | 29.5 g |
| Total volume* | 120 ml | 85.7 ml | 480 ml | 514 ml |

*: Water was added to make each total volume shown above.

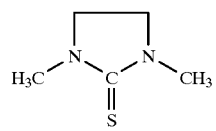

Silver halide solvent (1)

The reaction mixture obtained was washed and desalted (with a precipitant (a) under pH 4.0) in a conventional manner, and then admixed with 22 g of delimed gelatin, followed by dispersion. After adjusting the pH to 6.0, 4 ml of a 10% aqueous solution of sodium chloride and further 70 mg of antiseptics (1) were added to the resulting dispersion. Thus, a silver chloride emulsion having a grain size of 0.15 μm (Emulsion (I)) was obtained. The yield of Emulsion (I) was 630 g.

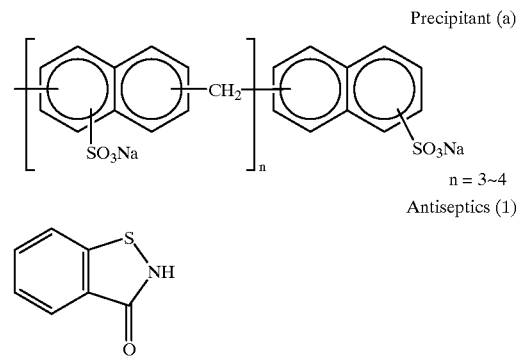

Precipitant (a)

n = 3~4

Antiseptics (1)

Another silver halide emulsion (Emulsion (II)) was prepared in the following manner:

A silver chlorobromide emulsion having a chloride content of 70 mol % was prepared in the same manner as the silver halide emulsion (I), except that the compositions of an aqueous gelatin solution, Soln. (II) and Soln. (IV) were changed to those shown in Tables 9 and 10. The grain size of the thus prepared Emulsion (II) was 0.18 μm.

TABLE 9

| Composition of aqueous gelatin solution | |
|---|---|
| H₂O | 650 ml |
| Lime-processed gelatin | 20 g |
| NaCl | 3 g |
| KBr | 0.3 g |
| Silver halide solvent (1) | 0.015 g |
| Temperature kept at | 40° C. |

TABLE 10

|  | Soln. (I) | Soln. (II) | Soln. (III) | Soln. (IV) |
|---|---|---|---|---|
| AgNO$_3$ | 20 g |  | 80 g |  |
| NaCl |  | 3.46 g |  | 20.7 g |
| KBr |  | 3.0 g |  | 18.0 g |
| Total volume* | 120 ml | 85.7 ml | 480 ml | 514 ml |

*: Water was added to make each total volume shown above.

A 100 μm-thick polyethylene terephthalate support coated with a dispersion of carbon black in polyvinyl chloride as a backing layer was coated with a gelatin subbing layer. Further thereon, ten constituent layers having the compositions described below (from the first layer to the tenth layer) were provided using a simultaneous multilayer coating method to prepare a color photosensitive material (Sample No. 1A). Ingredients comprising each composition and their respective coating amounts (expressed in g/m$^2$ unit) are described below. Coating amounts of the silver halide are shown in terms of silver.

| 1st layer (peeling layer): | |
|---|---|
| Hydroxyethyl cellulose (HEC-SP500; Daisel Ltd.) | 0.35 |
| Polyvinyl alcohol modified by alkyl groups at the molecular ends (average polymerization degree: 300) | 0.08 |
| Antistatic agent (Cpd-1) | 0.03 |
| 2nd layer (neighboring layer): | |
| Gelatin | 0.50 |
| 3rd layer (blue-sensitive layer): | |
| Emulsion (II) spectrally sensitized with blue sensitizing dyes (ExS-1 and ExS-2) | 0.33 |
| Gelatin | 0.99 |
| Cyan coupler (ExC-2) | 0.54 |
| Magenta coupler (ExM-1) | 0.02 |
| High boiling solvent (Solv-1) | 0.28 |
| 4th layer (interlayer): | |
| Gelatin | 0.38 |
| Color mixing inhibitor (Cpd-7) | 0.09 |
| Color mixing inhibitor (Cpd-10) | 0.02 |
| High boiling solvent (Solv-1) | 0.03 |
| High boiling solvent (Solv-3) | 0.01 |
| Ultraviolet absorbent (Cpd-5) | 0.02 |
| Ultraviolet absorbent (Cpd-4) | 0.02 |
| Ultraviolet absorbent (Cpd-3) | 0.01 |
| Ultraviolet absorbent (Cpd-6) | 0.02 |
| Polymer (Cpd-8) | 0.04 |
| 5th layer (infrared sensitive layer): | |
| Emulsion (II) spectrally sensitized with an infrared sensitizing dye (ExS-6) | 0.39 |
| Stabilizer (Cpd-9) | 0.008 |
| Gelatin | 1.29 |
| Cyan coupler (ExC-2) | 0.10 |
| Magenta coupler (ExM-2) | 0.28 |
| Yellow coupler (ExY-1) | 0.41 |
| Discoloration inhibitor (Cpd-2) | 0.05 |
| High boiling solvent (Solv-1) | 0.19 |
| High boiling solvent (Solv-2) | 0.04 |
| High boiling solvent (Solv-4) | 0.08 |
| Polymer (Cpd-11) | 0.03 |
| 6th layer (interlayer): | |
| Gelatin | 0.38 |
| Color mixing inhibitor (Cpd-7) | 0.09 |
| Color mixing inhibitor (Cpd-10) | 0.02 |
| High boiling solvent (Solv-1) | 0.03 |
| High boiling solvent (Solv-3) | 0.01 |
| Ultraviolet absorbent (Cpd-5) | 0.02 |
| Ultraviolet absorbent (Cpd-4) | 0.02 |
| Ultraviolet absorbent (Cpd-3) | 0.01 |
| Ultraviolet absorbent (Cpd-6) | 0.02 |
| Polymer (Cpd-8) | 0.04 |
| Yellow dye (YF-1) | 0.17 |
| 7th layer (green-sensitive layer): | |
| Emulsion (I) spectrally sensitized with a green sensitizing dye (ExS-3) | 0.43 |
| Gelatin | 1.09 |
| Cyan coupler (ExC-1) | 0.33 |
| Yellow coupler (ExY-2) | 0.42 |
| High boiling solvent (Solv-1) | 0.08 |
| High boiling solvent (Solv-2) | 0.11 |
| Polymer (Cpd-11) | 0.03 |
| 8th layer (interlayer): | |
| Gelatin | 0.38 |
| Color mixing inhibitor (Cpd-7) | 0.09 |
| Color mixing inhibitor (Cpd-10) | 0.02 |
| High boiling solvent (Solv-1) | 0.03 |
| High boiling solvent (Solv-3) | 0.01 |
| Ultraviolet absorbent (Cpd-5) | 0.02 |
| Ultraviolet absorbent (Cpd-4) | 0.02 |
| Ultraviolet absorbent (Cpd-3) | 0.01 |
| Ultraviolet absorbent (Cpd-6) | 0.02 |
| Polymer (Cpd-8) | 0.04 |
| Irradiation preventing dye (Dye-1) | 0.005 |
| Irradiation preventing dye (Dye-2) | 0.02 |
| 9th layer (red-sensitive layer): | |
| Emulsion (I) spectrally sensitized with red sensitizing dyes (ExS-4 and ExS-5) | 0.35 |
| Gelatin | 1.14 |
| Yellow coupler (ExY-1) | 0.60 |
| Magenta coupler (ExM-2) | 0.25 |
| Discoloration inhibitor (Cpd-2) | 0.06 |
| Polymer (Cpd-11) | 0.03 |
| High boiling solvent (Solv-1) | 0.12 |
| High boiling solvent (Solv-2) | 0.03 |
| High boiling solvent (Solv-4) | 0.11 |
| 10th layer (protective layer): | |
| Gelatin | 0.70 |
| Antihalation dye (fine-grain dispersion) | 0.15 |
| Carboxymethyl cellulose | 0.05 |
| Polymer (Cpd-12) | 0.14 |
| Surfactant (Cpd-13) | 0.03 |
| Hardener (H-1) | 0.12 |

In each layer were further used sodium dodecylbenzenesulfonate as an assistant for emulsified dispersion, ethyl acetate as an auxiliary solvent, surfactant (Cpd-14) as a coating aid, and potassium polystyrenesulfonate as a thickener.

The structural formulae of the compounds used are shown below:

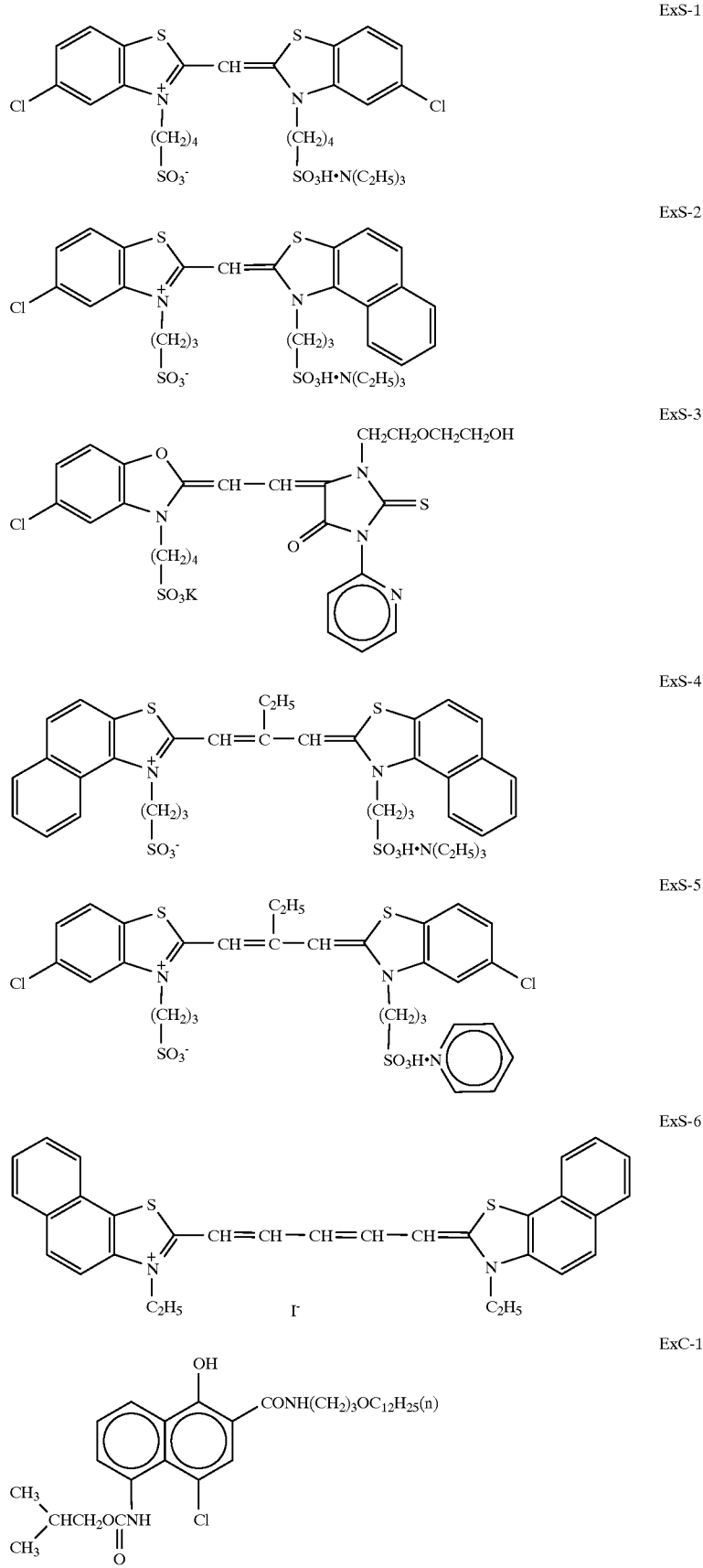
ExS-1
ExS-2
ExS-3
ExS-4
ExS-5
ExS-6
ExC-1

ExM-1
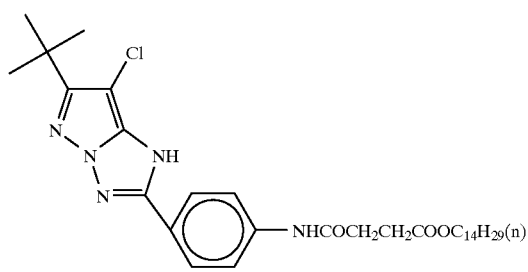
ExY-1
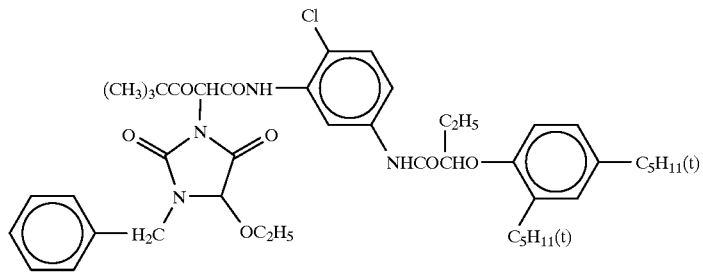
ExC-2
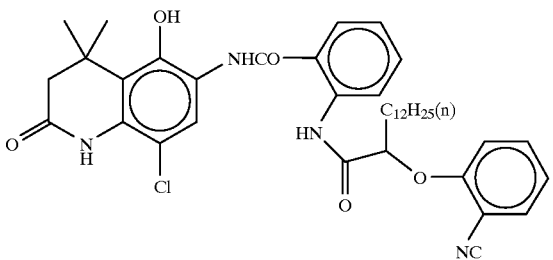
ExM-2
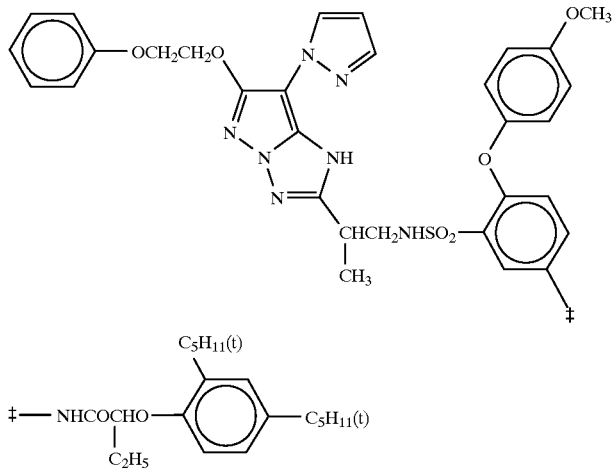
ExY-2
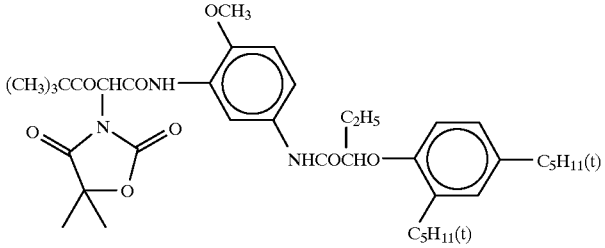

-continued
Cpd-1
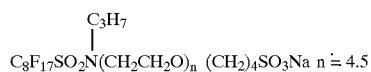
Cpd-2
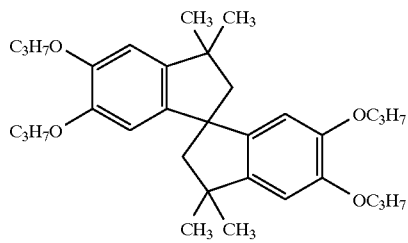
Cpd-3
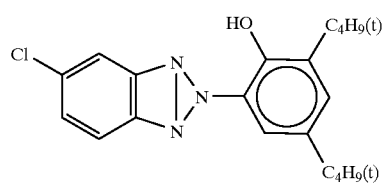
Cpd-4
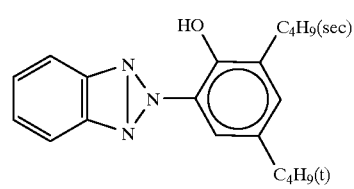
Cpd-5
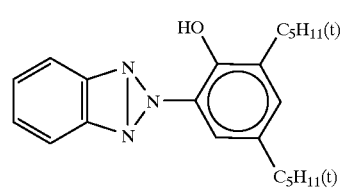
Cpd-6
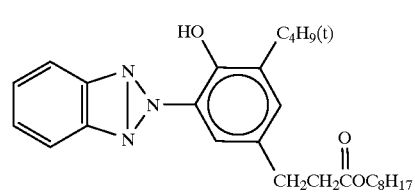
Cpd-7
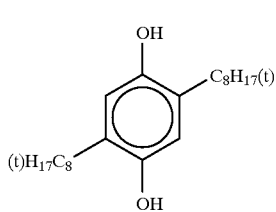
Cpd-8
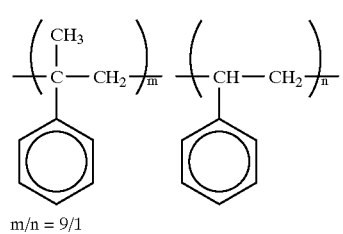
m/n = 9/1

Cpd-9
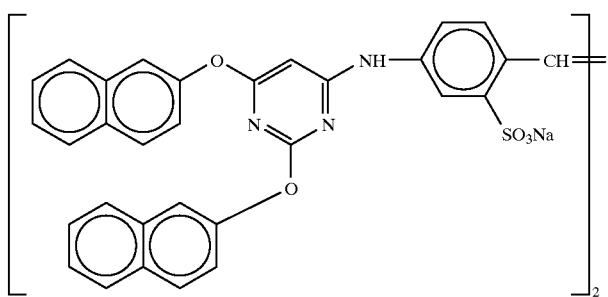
Cpd-10
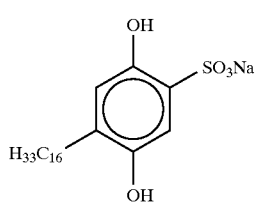
Cpd-11
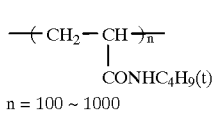
n = 100 ~ 1000
Cpd-12
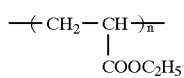
n = 100 ~ 1000
Cpd-13
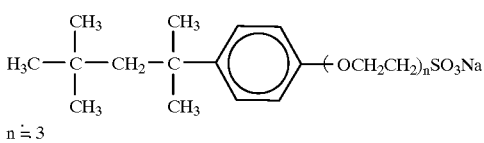
n ≒ 3
Cpd-14
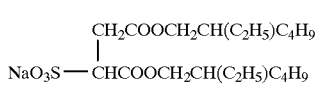
Solv-1
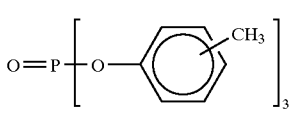
Solv-2
$O=P{\left[O-C_8H_{17}(EH)\right]}_3$
Solv-3
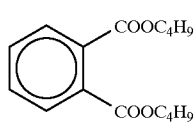
Solv-4
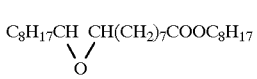

-continued

YF-1

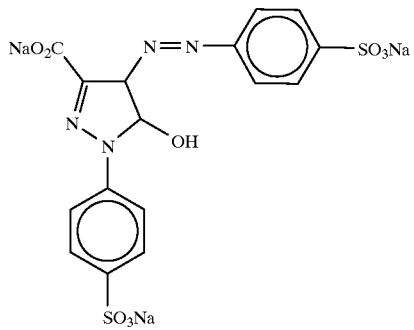

Dye-1

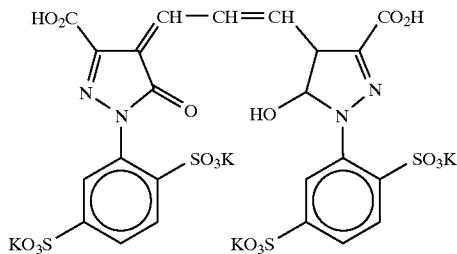

Dye-2

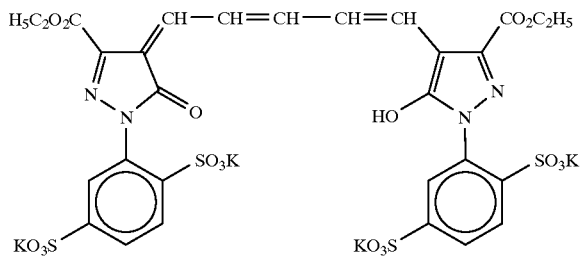

H-1

$CH_2=CHSO_2CH_2SO_2CH=CH_2$

Antihalation dye

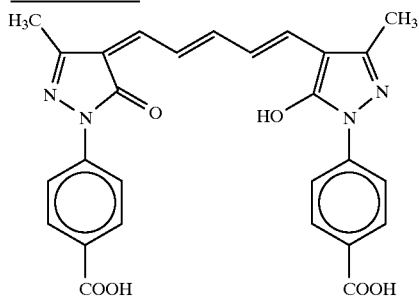

COMPARATIVE EXAMPLE 2

A color photosensitive material (sample No. 1B) was prepared in the same manner as for sample No. 1A, except that each of the coating amounts of high boiling solvents in the 7th layer (green-sensitive layer) were doubled.

COMPARATIVE EXAMPLE 3

A color photosensitive material (sample No. 1C) was prepared in the same manner as for sample No. 1A, except that the yellow coupler and the cyan coupler used in the 7th layer (green-sensitive layer) were replaced with the same molar amounts of the following cyan coupler (comparative Coupler (A)) and yellow coupler (comparative Coupler (B)), respectively.

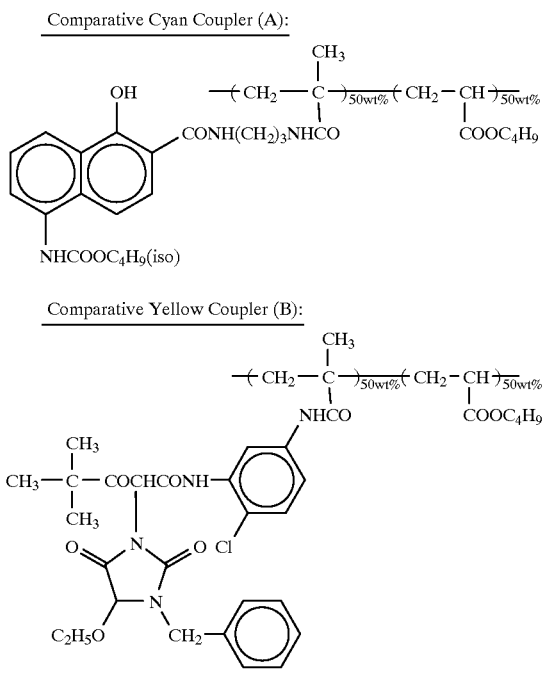

EXAMPLE 1

Color photosensitive materials (sample Nos. 2A to 2Z) were prepared in the same manner as for sample No. 1A, except that the combination of cyan coupler (ExC-1) and yellow coupler (ExY-2) used in the 7th layer (green-sensitive layer) were replaced with polymer couplers (P-1) to (P-4), (P-6) to (P-9), (P-11), (P-13), (P-16), (P-17), (P-20), (P-25), (P-26), (P-30), (P-32), (P-35), (P-43), (P-47), (P-51), (P-53), (P-55), (P-57), (P-59) and (P-60) according to the invention, respectively. Similarly, sample Nos. 3A to 3N were prepared in the same manner as for sample No. 1A except for replacing the combination of cyan coupler (ExC-1) and yellow coupler (ExY-2) by each of polymer couplers (P-61) to (P-64), (P-68), (P-73), (P-74), (P-76), (P-80), (P-90), (P-95) and (P-102).

In the 7th layer of each of these sample Nos. 2A to 2X and 3A to 3L, only Solv-1 was used as the high-boiling solvent in the same weight as that of the inventive polymer coupler used therein.

A 1.1 mm-thick, transparent, alkali-free glass (20 cm×30 cm in size) was used as light-transmitting substrate, and the surface thereof was coated with a composition prepared by mixing gelatin and colloidal silica (average particle size: 7–9 m$\mu$) in the ratio of 1 to 3 by weight and adding thereto saponin as a surfactant. The dry thickness of the coating layer thus formed was 0.2 $\mu$m.

The protective layer of the above prepared color photosensitive material and the coating layer of the transparent glass substrate were brought into intimate contact and passed through a laminator set to give the contact surface a temperature of about 130° C. at a speed of 0.45 m/min. After cooling to about room temperature, the support of the photosensitive material was stripped off the emulsion surface together with the peeling layer to provide the transparent glass substrate having thereon the 2nd to 10th emulsion layers. As a result these emulsion layers were uniformly adhered and free from blank areas.

Each of the thus prepared substrates having the emulsion layers was subjected to four successive exposure operations from the emulsion side using tungsten light and the mask filter as shown in FIG. 3 on which a color screen conforming to the spectral sensitivity of the photosensitive material was superposed. The thus exposed substrate was then subjected to photographic processing in accordance with the following processing steps. Thus, a color filter with three colors, B, G and R, and black color developed by a single photographic processing was obtained.

| Processing Step | Temperature | Time |
|---|---|---|
| Hardening | 38° C. | 3 min. |
| Washing (1) | 35° C. | 1 min. |
| Color development | 38° C. | 80 sec. |
| Bleach-fix | 38° C. | 90 sec. |
| Washing (2) | 35° C. | 40 sec. |
| Washing (3) | 35° C. | 40 sec. |
| Drying | 60° C. | 2 min. |

The composition of each processing solution is shown below.

| Hardening solution: | |
|---|---|
| Sodium sulfate (anhydrous) | 160.0 g |
| Sodium carbonate (anhydrous) | 4.6 g |
| Glyoxal-propylene glycol adduct (55%) | 20.0 ml |
| Water to make | 1 l |
| pH (25° C.) = 9.5 | |
| Color developer: | |
| Water | 800 ml |
| Diethylene glycol | 12.0 ml |
| Benzyl alcohol | 13.5 ml |
| Ethylenediaminetetraacetic acid | 3.0 g |
| Disodium 4,5-dihydroxybenzene-1,3-disulfonate | 0.5 g |
| Triethanolamine | 12.0 g |
| Potassium chloride | 6.5 g |
| Potassium bromide | 0.03 g |
| Potassium carbonate | 27.0 g |
| Sodium sulfite | 0.1 g |
| Disodium N,N-bis(sulfonatoethyl)hydroxylamine | 5.0 g |
| Sodium triisopropylnaphthalene(β)sulfonate | 0.1 g |
| N-ethyl-N-(β-methanesulfonamidoethyl)-3-methyl-4-aminoaniline sesquisulfate monohydrate | 5.0 g |
| Water to make | 1 l |
| pH (25° C.) = 10.0 | |
| Bleach-fix bath: | |
| Water | 600 ml |
| Ammonium thiosulfate (750 g/l) | 93 ml |
| Ammonium sulfite | 40.0 g |
| Ammonium bromide | 25.0 g |
| Ammonium ethylenediaminetetraacetatoferrate(III) | 55.0 g |
| Ethylenediaminetetraacetic acid | 5.0 g |
| Nitric acid (67%) | 30.0 g |
| Water to make | 1 l |
| pH (25° C.) = 5.8 | |

Washing Water:

Deionized water having electric conductivity of not more than 5 $\mu$S.

Every color filter thus obtained had R, G and B colors with excellent spectral transmission with no color turbidity, and black stripes of high density.

Each color filter was placed in an oven, and therein it was heated at 180° C. for 2 hours. After the heating, green pixels of each color filter were observed under an optical microscope, and the extent of blur was judged. Further, light fastness of each color filter was examined with a Xenon fade-o-meter (85,000 lux, for 10 days), and evaluated in terms of the percentages of yellow and cyan dyes remaining after the irradiation with Xenon light. With respect to the color filters using the photosensitive materials prepared in Example 1, the results obtained are shown in Table 11; while, with respect to the color filters using the photosensitive materials prepared in Example 2, the results obtained are shown in Table 12.

In these tables, the mark "+" denotes a high extent of blur, the mark "±" denotes a blur in an allowable level, and the mark "−" denotes no blur. Additionally, the light fastness value was obtained as the percentage of each residual dye with the optical density at $\lambda_{max}$ after the irradiation with Xenon light.

TABLE 11

| Sensitive Material No. | Coupler in 7th layer | Extent of pixel blur | Light Fastness yellow dye | Light Fastness cyan dye | Note |
|---|---|---|---|---|---|
| 1A | ExC-1 ExY-2 | ± | 72 | 70 | comparison |
| 1B | ExC-1 ExY-2 | + | 83 | 80 | comparison |
| 1C | Comparative coupler (A) Comparative coupler (B) | ± | 70 | 65 | comparison |
| 2A | P-1 | − | 97 | 94 | invention |
| 2B | P-2 | − | 95 | 94 | invention |
| 2C | P-3 | − | 94 | 94 | invention |
| 2D | P-4 | − | 95 | 94 | invention |
| 2E | P-6 | ± | 93 | 93 | invention |
| 2F | P-7 | − | 96 | 95 | invention |
| 2G | P-8 | − | 90 | 93 | invention |
| 2H | P-9 | − | 90 | 93 | invention |
| 2I | P-11 | − | 91 | 94 | invention |
| 2J | P-13 | − | 93 | 94 | invention |
| 2K | P-16 | ± | 95 | 94 | invention |
| 2L | P-17 | − | 94 | 93 | invention |
| 2M | P-20 | − | 94 | 94 | invention |
| 2N | P-25 | ± | 92 | 94 | invention |
| 2O | P-26 | − | 92 | 94 | invention |
| 2P | P-30 | − | 95 | 94 | invention |
| 2Q | P-32 | − | 95 | 94 | invention |
| 2R | P-35 | − | 94 | 93 | invention |
| 2S | P-43 | − | 95 | 94 | invention |
| 2T | P-47 | − | 94 | 90 | invention |
| 2W | P-51 | − | 93 | 90 | invention |
| 2V | P-53 | − | 93 | 92 | invention |
| 2W | P-55 | − | 92 | 92 | invention |
| 2X | P-57 | − | 88 | 90 | invention |

TABLE 12

| Sensitive Material No. | Coupler in 7th layer | Extent of pixel blur | Light Fastness yellow dye | Light Fastness cyan dye | Note |
|---|---|---|---|---|---|
| 1A | ExC-1 ExY-2 | ± | 72 | 70 | comparison |
| 1B | ExC-1 ExY-2 | + | 83 | 80 | comparison |
| 1C | Comparative coupler (A) Comparative coupler (B) | ± | 70 | 65 | comparison |
| 3A | P-59 | − | 91 | 90 | invention |
| 3B | P-60 | − | 90 | 88 | invention |
| 3C | P-61 | − | 90 | 87 | invention |
| 3D | P-62 | − | 90 | 88 | invention |
| 3E | P-63 | − | 88 | 90 | invention |

TABLE 12-continued

| Sensitive Material No. | Coupler in 7th layer | Extent of pixel blur | Light Fastness yellow dye | Light Fastness cyan dye | Note |
|---|---|---|---|---|---|
| 3F | P-64 | − | 88 | 90 | invention |
| 3G | P-68 | − | 91 | 90 | invention |
| 3H | P-73 | − | 90 | 97 | invention |
| 3I | P-74 | − | 90 | 85 | invention |
| 3J | P-76 | ± | 90 | 88 | invention |
| 3K | P-80 | ± | 90 | 88 | invention |
| 3L | P-90 | − | 92 | 90 | invention |
| 3M | P-95 | − | 92 | 90 | invention |
| 3N | P-102 | − | 85 | 87 | invention |

As can be seen from the results in Tables 11 and 12, the color filters prepared by using the polymer couplers of the invention exhibited less blur due to heat in the green pixel areas, and further the yellow and cyan components thereof had improved light fastness. Thus, the superiority of the polymer couplers of the invention was demonstrated.

While the invention has been described in detail and with reference to specific examples thereof, it will be apparent to one skilled in the art that various changes and modifications can be made therein without departing from the spirit and scope thereof.

What is claimed is:

1. A silver halide color photosensitive material comprising at least one polymer coupler selected from the group consisting of:

copolymers derived from at least one kind of yellow coupler monomer represented by the following formula (I) and at least one kind of cyan coupler monomer represented by the following formula (II); and copolymers derived from at least one kind of yellow coupler monomer represented by the following formula (I), at least one kind of cyan coupler monomer represented by the following formula (II) and at least one kind of non-color-forming monomer having an ethylene group and no capability to couple with an oxidized product of an aromatic primary amine developing agent:

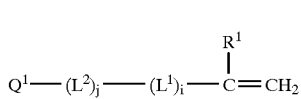

(I)

wherein $R^1$ represents a hydrogen atom, a chlorine atom, an alkyl group or an aryl group; $L^1$ represents —C(=O)N($R^2$)—, —C(=O)O—, —N($R^2$)C(=O)—, —OC(=O)—, or a group represented by the following formula (III), (IV) or (V); $R^2$ represents a hydrogen atom, an alkyl group, an aryl group or a heterocyclic group; $L^2$ represents a divalent linkage group connecting $L^1$ with $Q^1$; i represents 0 or 1; j represents 0 or 1; and $Q^1$ represents a yellow coupler residue capable of forming a yellow dye by coupling with an oxidized product of an aromatic primary amine developing agent;

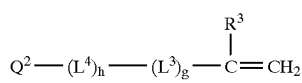
(II)

wherein $R^3$, $L^3$, $L^4$, g and h have the same meanings as $R^1$, $L^1$, $L^2$, i and j in the above formula (I), respectively; and $Q^2$ represents a cyan coupler residue capable of forming a cyan dye by coupling with an oxidized product of an aromatic primary amine developing agent wherein $Q^2$ is a group represented by the following formula (Cp-12), (Cp-13) or (Cp-14):

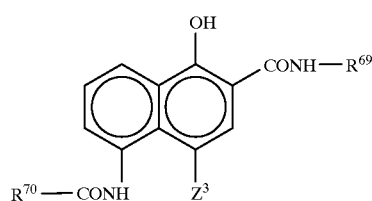
(Cp-12)

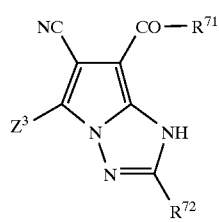
(Cp-13)

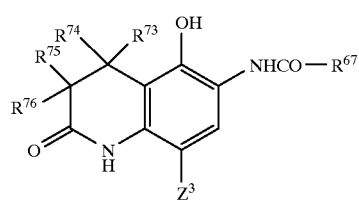
(Cp-14)

wherein $R^{67}$, $R^{70}$ and $R^{71}$ represent $R^{41}$, $R^{41}$ O— or $R^{41}$N ($R^{43}$)—, wherein $R^{41}$ represent an alkyl group, an alkenyl group, an aryl group or a heterocyclic group, and $R^{43}$ represents a hydrogen atom, an alkyl group, an alkenyl group, an aryl group or a heterocyclic group; $R^{69}$ represents on alkyl group, an alkenyl group, an aryl group or a heterocyclic group; $R^{72}$ represents $R^{43}$, $R^{41}$S—, $R^{43}$O—, $R^{41}$C(=O)N($R^{43}$)—, $R^{41}$SO$_2$N($R^{43}$)—, $R^{41}$N($R^{43}$)— or $R^{45}$N($R^{43}$)C(=O)N($R^{44}$)—, wherein $R^{44}$ and $R^{45}$ each have the same meaning as $R^{43}$; $R^{73}$, $R^{74}$, $R^{75}$ and $R^{76}$ each independently represent a hydrogen atom, a halogen atom, an alkyl group or an aryl group; $R^{73}$ and $R^{74}$, $R^{74}$ and $R^{75}$ or $R^{75}$ and $R^{76}$ may be connected to each other to form a 5- to 7-membered ring; and $Z^3$ represents a hydrogen atom or a group which dissociates itself upon reaction with an oxidized product of an aromatic primary amine developing agent;

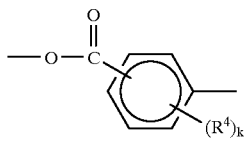
(III)

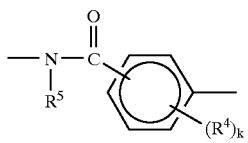
(IV)

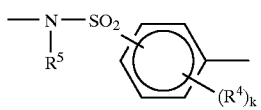
(V)

wherein $R^4$ represents a substituent group, $R^5$ has the same meaning as $R^2$ in the above formula (I), and k represents an integer of from 0 to 4.

2. The silver halide color photosensitive material of claim 1, wherein said material is used for producing a color filter.

3. The silver halide color photosensitive material of claim 2, which comprises a support having thereon at least three silver halide emulsion layers each having a different color sensitivity and containing couplers in such combination as to develop blue, green and red colors, respectively, by coupling with an oxidized product of an aromatic primary amine developing agent.

4. The silver halide photosensitive material of claim 3, further comprising at least one silver halide emulsion layer which is different in color sensitivity from the other emulsion layers and contains a coupler capable of making color compensation to produce a substantially black color having a transmission density of at least 2.5 when all the couplers on the support undergo coupling reaction.

* * * * *